United States Patent [19]

Windel et al.

[11] Patent Number: 5,671,146
[45] Date of Patent: Sep. 23, 1997

[54] METHOD FOR IMPROVING THE SECURITY OF POSTAGE METER MACHINES

[75] Inventors: Harald Windel; Frank Reisinger; Claus Freytag; Ralf Kubatzki; Enno Bischoff; Andreas Wagner; Peter Rieckhoff; Marcus Hansel; Stephan Günther, all of Berlin, Germany

[73] Assignee: Francotyp-Postalia GmbH, Birkenwerder, Germany

[21] Appl. No.: 346,909

[22] Filed: Nov. 30, 1994

[30] Foreign Application Priority Data

Dec. 21, 1993 [DE] Germany .......................... 43 44 476.8

[51] Int. Cl.⁶ .................................................. G07B 17/04
[52] U.S. Cl. .......................... 364/464.2; 235/375; 340/572
[58] Field of Search .......................... 235/375; 324/110; 340/572, 687, 825.33, 825.34; 364/464.02, 464.03, 550

[56] References Cited

U.S. PATENT DOCUMENTS

| | | | |
|---|---|---|---|
| 3,255,439 | 6/1966 | Simjian | 340/825.33 |
| 4,129,302 | 12/1978 | Stone | 273/236 |
| 4,251,874 | 2/1981 | Check, Jr. | 364/466 X |
| 4,347,506 | 8/1982 | Duwel et al. | 340/679 |
| 4,549,281 | 10/1985 | Eckert et al. | 364/464.02 |
| 4,746,234 | 5/1988 | Harry | 400/120 |
| 4,785,417 | 11/1988 | Obrea | 364/550 X |
| 4,807,139 | 2/1989 | Liechti | 364/464.02 |
| 4,811,234 | 3/1989 | Storace | 364/464.02 |
| 4,812,965 | 3/1989 | Taylor | 364/550 |
| 4,812,994 | 3/1989 | Taylor et al. | 364/464.02 |
| 4,864,506 | 9/1989 | Storace | 364/464.02 |
| 5,077,660 | 12/1991 | Haines et al. | 364/464.02 |
| 5,181,245 | 1/1993 | Jones | 380/23 |
| 5,243,654 | 9/1993 | Hunter | 380/51 |
| 5,585,613 | 12/1996 | Bell et al. | 235/101 |

FOREIGN PATENT DOCUMENTS

| | | |
|---|---|---|
| 0 388 840 | 9/1990 | European Pat. Off. . |
| 0 388 839 | 9/1990 | European Pat. Off. . |
| 0 194 660 | 3/1992 | European Pat. Off. . |
| 0 516 403 | 12/1992 | European Pat. Off. . |
| 0 547 922 | 6/1993 | European Pat. Off. . |
| 0 576 113 | 12/1993 | European Pat. Off. . |
| 0 578 042 | 1/1994 | European Pat. Off. . |
| 0 615 211 | 8/1994 | European Pat. Off. . |
| OS 41 29 302 | 3/1993 | Germany . |
| OS 42 24 955 | 1/1994 | Germany . |
| 2 233 937 | 1/1991 | United Kingdom . |

*Primary Examiner*—Edward R. Cosimano
*Attorney, Agent, or Firm*—Hill, Steadman & Simpson

[57] ABSTRACT

In a method for improving the security of postage meter machines, the intent to conduct an authorized opening of the machine, such as for inspection or maintenance purposes, is first reported to a central data station, after the postage meter machine to be opened has established communication between the machine and the central data station. The postage meter machine has a code word stored therein, the presence of this code word being necessary for authorized operation of the machine. Following the request to open, the central data station transmits a new code word to the postage meter machine, which is also stored therein. Upon any opening of the postage meter machine, the current code word is automatically erased. If the opening is authorized, and thus a new code word is stored in the machine, this new code word is automatically substituted for the erased code word, so that operation of the machine can proceed in a normal fashion. If the opening is unauthorized, and thus there is no new code word to replace the erased code word, the machine is automatically placed in a first mode, which prevents operation of the machine.

82 Claims, 11 Drawing Sheets

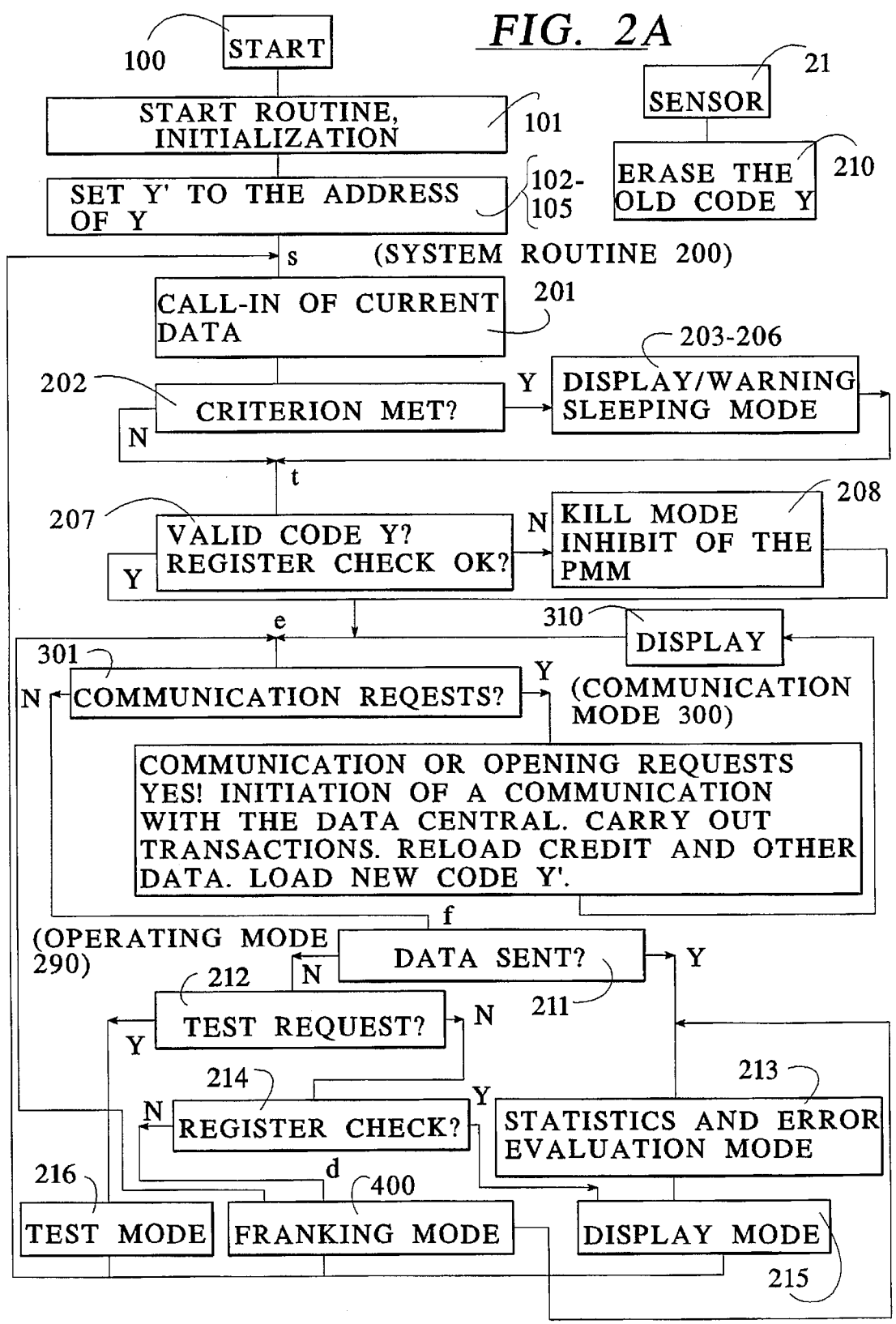

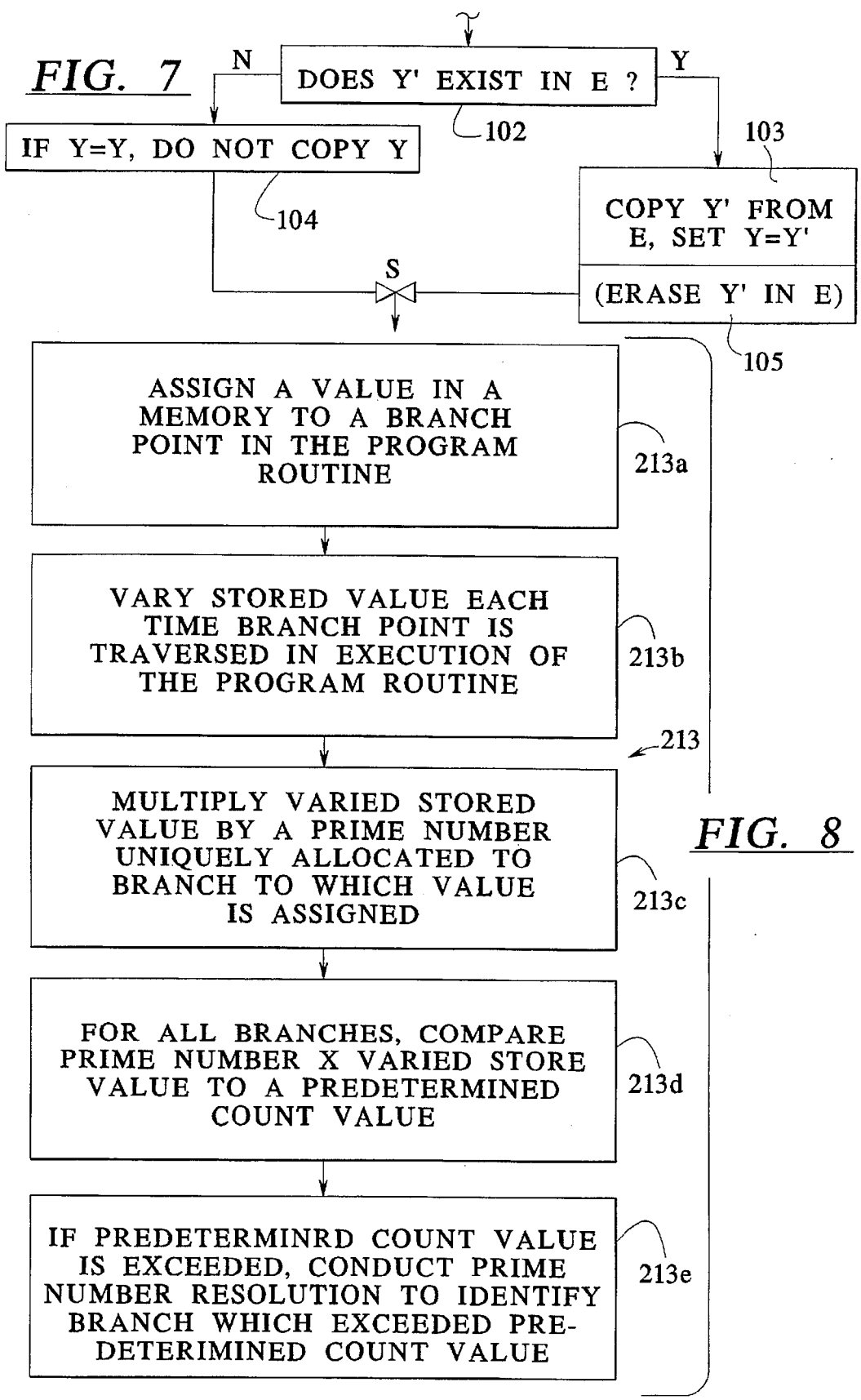

METHOD FOR IMPROVING THE SECURITY OF POSTAGE METER MACHINES

BACKGROUND OF THE INVENTION

1. Field of the Invention

The present invention is directed to a method for improving the security of postage meter machines capable of communicating with and, to a certain extent, controlled by, a remote central station.

2. Description of the Prior Art

In a form agreed upon with the postal authority in a country of usage, a postage meter machine generally produces an impression flush right parallel to the upper edge of postal items to be franked matter, beginning with the content of a postal value in the postmark, date in the date stamp and mark impressions for advertising slogans and, potentially, the type of mailing in the optional mark. The postal value, the date and the type of mailing thereby form the variable information to be entered in conformity with the piece of mail.

The postal value is usually the delivery fee (franking) pre-paid by the sender that is obtained from a refillable credit register and is employed for stamping the mail. In the current account method, by contrast, a register is merely incremented dependent on the frankings undertaken with the postal value and is read at regular intervals by a postal inspector.

Fundamentally, every franking that has been undertaken must charged to the user billed and every manipulation that leads to a non-charged franking must be prevented.

A known postage meter machine is equipped with at least one input means, one output means, an input/output control module, a memory means that carries a program, data and, in particular, the accounting register, a control means and a printer module. Measures must also be undertaken given a printer module having a mechanical printing arrangement to insure that the printing mechanism cannot be misused for unbilled impressions when it is switched off.

The invention is particularly directed to postage meter machines that deliver a fully electronically produced impression for franking postal matter, including the impression of an advertising slogan. This means that a valid franking that is not accounted for must only be prevented when the machine is in the activated condition.

In a postage meter machine disclosed in U.S. Pat. No. 4,746,234, fixed and variable information are stored in memory means (ROM, RAM), which are then mad these out with a microprocessor, when a letter actuates a microswitch on the conveying path preceding the printing position, in order to form a print control signal. The two types of data are subsequently electronically combined to form a printing format and can be printed on an envelope to be franked with a thermotransfer printing means.

A method for controlling the column-by-column printing of a postage character is proposed in a postage meter machine (European Published Application 578 042) that combines fixed and variable data converted separately from one another into graphic pixel image data during the column-by-column printing. It would therefore be difficult to undertake a manipulation at the print control signal without significant and expensive outlay when the printing ensues at high speed.

On the other hand, the memory means comprises at least one non-volatile memory module that contains the currently remaining credit that results therefrom that the postage value to be respectively printed is subtracted from a credit previously loaded into the postage meter machine. The postage meter machine inhibits when the remaining credit is zero.

Known postage meter machines contain three relevant postal registers in at least one memory for consumed total value (incrementing register), remaining credits still available (decrementing register), and a register for a checksum. The checksum is compared to the sum of used total value and available credit. A check for proper accounting is thus already possible.

It is also possible to transmit reloading information to the postage meter machine from a central data station via a remote value prescription in order to reload a credit into the register for the remaining credit (remaining value). Security measures suitable for this type of transaction must be undertaken so that the credit stored in the postage meter machine cannot be replenished in an unauthorized way. The aforementioned solutions for protecting against misuse and attempted forgeries require additional outlay for material and time.

U.S. Pat. No. 4,864,506 discloses an approach wherein communication to the remote central data station be undertaken proceeding from the postage meter machine when the value of the credit in the decrementing register lies below a threshold and a predetermined time has been reached.

The above-recited patent also discloses the establishment of a telephonic connection by the central data station to the postage meter machine after a defined chronological duration with the postage meter machine replying to the central data station only at predetermined times for receiving register data and for checking whether the postage meter machine is still connected to a specific telephone number.

It is also disclosed in the aforementioned patent to interrogate the identity number of the postage meter machine and the values in the decrementing and incrementing register for authorization by the central data station before a reloading of credit into the postage meter machine.

The aforementioned patent also discloses that the communication of the central data station with the postage meter machine need not remain limited to a mere transfer of credit into the postage meter machine. On the contrary, the communication of the central data station with the postage meter machine given a log-off of the postage meter machine is also utilized for transmitting the remaining credit of the postage meter machine into the central data station. The value and the decrementing postal register of the postage meter machine is then zero, this effectively shutting the postage meter machine off.

A security housing for postage meter machines that includes internal sensors is disclosed in German OS 41 29 302. The sensors are switches connected to a battery and are activated when the security housing is opened in order to erase a memory storing the remaining credit (decrementing postal register) by interrupting the energy supply. As is known, however, the condition (content) which a voltage-free memory module assumes upon restoration of the voltage is not predictable. Thus, an unpaid, higher remaining credit may also arise. Additionally, it cannot be precluded that the remaining credit may be at least partially lost under these circumstances. This, however, would be disadvantageous in case of an inspection since any "lost" credit that had been paid for by the user of the postage meter machine must then also be reloaded, but the amount of this remaining credit could then be falsified. Moreover, this document does not disclose means for preventing an unauthorized manipulator for restoring an unpaid remaining credit.

In known postage meter machines, further security measures such as break-off screws and the use of a encapsulated, shielded security housing are employed. Keys and a combination lock are also standard in order to make access to the postage meter machine more difficult.

In addition to these known mechanical techniques, an unauthorized access to a use of the postage meter machine is to be prevented in the machine disclosed in U.S. Pat. No. 4,812,994 by inhibiting the postage meter machine given the absence of a password and/or during a predetermined time interval. The password can be entered via a MODEM, by a chip card or can be manually entered into the postage meter machine via the keyboard. After a positive comparison against a password stored in the postage meter machine, the postage meter machine is enabled. A security module (EPROM) is integrated in the control module of the debiting unit. As a further security measure, an encoding module (separate microprocessor or program for FM-CPU based on DES or RSA code) is provided, which produces a recognition number in the postmark that comprises the postage value, the user number, a transaction number and the like.

It is still possible, however, that the password could be discovered and could be placed into the possession of an unauthorized manipulator together with the postage meter machine.

U.S. Pat. No. 4,812,965 discloses a remote inspection system for postage meter machines that is based on specific messages in the impression of postal matter that must be sent to the central station or transmitted via MODEM in response to a remote interrogation. Sensors within the postage meter machine are intended to detect any falsification action that has been undertaken so that a flag can be set in appertaining memories in the event that operations were performed on the postage meter machine for manipulative purposes. Such an operation could ensue in order to load an unpaid credit into the registers.

It is still not fully preventable, however, that a dexterous unauthorized manipulation could in reset the flag and the registers into their original condition after the production of postage impressions that were not accounted for. Such a manipulation could not be detected by the central data station via remote inspection if this canceled manipulation preceded the remote inspection. The reception of the post card from the central data station on which the franking to be undertaken for inspection purposes should ensue also allows the manipulator adequate time, and puts a manipulator on notice, to reset the postage meter machine into the original condition. A higher level of security can thus not be achieved.

The disadvantage of such a system is that one cannot prevent a knowledgeable manipulator who breaks into the postage meter machine from subsequently erasing the flags to eliminate the evidence of tampering. One can thus similarly not prevent the manipulation of the impression itself that is produced by a properly operated machine manipulated. In known machines, there is a possibility of producing impressions having the postage value of zero. Such zero flankings are required for testing purposes and could also be subsequently falsified in that a postage value greater than zero is simulated.

A security impression according to European Patent Application 576 113 provides symbols in a marking field in the postmark that contain a encrypted information. This allows the postal authority which collaborates with the central data station, to recognize a manipulation at the postage meter machine at arbitrary points in time based on the respective security impression. Although an ongoing monitoring of such postal matter provided with such a security impression is technologically possible via appropriate security markings in the mark format, this means additional outlay at the post office. Given a monitoring based on spot checks, however, a manipulation is usually is only recognized long after the fact.

Moreover, an additional evaluation can ensue in the central data station of a user of a postage meter machine that has been continued to be operated by the user beyond the inspection date. No conclusions regarding manipulation undertaken for falsification purposes, however, are yet able to be derived from these evaluations.

U.S. Pat. No. 4,251,874 discloses a mechanical printer unit which must be preset for printing and which has a detector means employed for monitoring the presetting. Further, means for identifying errors in data and control signals are provided in the electronic accounting system. When this number of errors reaches a predetermined value, further operation of a postage meter machine is interrupted. The sudden outage of the postage meter machine, however, is disadvantageous for the user of the postage meter machine. In the case of a non-mechanical printer, such internal errors can rarely be anticipated and the postage meter machine is shut off immediately anyway in the event of a serious fault. Moreover, the protection against a manipulation of the postage meter machine does not become significantly greater by shutting the postage meter machine after a predetermined number of errors.

U.S. Pat. No. 4,785,417 discloses a postage meter machine having program sequence monitoring. The correct sequence of a larger program segment is monitored with a specific code allocated to each program part, this specific code being stored in a specific memory cell in the RAM when the program segment is called in. A check is then carried out to determine whether the code stored in the aforementioned memory call is continuously present in the program part running at the moment. If the run of a program part were interrupted given a manipulation and if a different program part were to sequence, an error can be identified on the basis of such a monitoring query. The comparison, however, can only be implemented in the main sequence. Subsequences, for example security-related calculations that are used by a plurality of main sequences, cannot be checked for execution of the program part on the basis of such a monitoring because the program check ensues independently of the program sequence. If a manipulation occurs wherein allowed program parts or sub-sequences are additionally introduced into main sequences or are omitted therefrom, or wherein a branch is made to sub-sequences, then no error would be identified since the length of the program part is neither identified nor can an identification be made as to which program branch was run how often.

Another type of expected manipulation is the reloading of the postage meter machine register with a credit value that has not been deducted. This necessitates a protected reloading. According to U.S. Pat. No. 4,549,281, an additional security measure can be employed which is the comparison of an internal, fixed combination stored in a non-volatile register with an entered, external combination, whereby the postage meter machine is blocked with inhibit electronics after a plurality of failed attempts, i.e. non-identity of the combinations. According to U.S. Pat. No. 4,835,697, the combination can be changed in order to prevent unauthorized access to the postage meter machine.

U.S. Pat. No. 5,077,660 also discloses a method for changing the configuration of the postage meter machine, whereby the postage meter machine is switched from the operating mode into a configuration mode on the basis of a suitable input via a keyboard, and a new meter type number can be entered which corresponds to the desired plurality of features. The postage meter machine generates a codeword (password) for the communication with the computer of the data central and the entry of the identification data and of the new meter type number in the aforementioned computer, which likewise generates a corresponding codeword (password) for communication to and entry into the postage meter machine wherein the two codes are compared. Given agreement between the two codewords, the postage meter machine is configured and switched into the operating mode. The data central always has exact records of the meter type which has been set for the corresponding postage meter machine. The security, however, is dependent only on the level of difficulty of breaking the encryption encoding of the transmitted codeword.

Over and above this, European Application 388 840 discloses a comparable security technique for setting a postage meter machine in order to purge it of data without having to transport the postage meter machine to the manufacturer. Here, too, the security is solely dependent on the encoding of the transmitted code.

It is known to combine the secured reloading of credit into a postage meter machine with an automatic signal transmission from the postage meter machine to the data central, as disclosed in U.S. Pat. No. 3,255,439, whenever a predetermined sum of money that was franked or a predetermined piece number of processed mailings or a predetermined time period was reached. Alternatively, a signal corresponding to the sum of money, piece number or time period can be communicated. The communication thereby ensues with binary signals via converters connected to one another via a trunk. The machine receives reloading data corresponding to the credit balance that are secured in exactly the same way and is inhibited when no credit is resupplied.

U.S. Pat. No. 4,811,234 discloses that transactions be implemented encrypted and to interrogate registers of the postage meter machine and to communicate the register data to the data central in order to display a chronological reference to the diminution of the amount authorized for availability, the amount being stored in the register. The postage meter machine identifies itself at the data central by its encrypted register content when a pre-settable threshold is reached. The data central modifies the requested franking amount up to which franking is allowed to be carried out on the basis of corresponding authorization signals. The encryption is thus the sole protection against a manipulation of the register readings. The data central can thus not identify the occurrence of a manipulation if a manipulator always properly loads the same amount at the same chronological intervals, but franks a far higher amount in the meantime with the manipulated postage meter machine.

European Application 516 403 discloses that the errors of the postage meter machine logged in the past and stored in a memory be regularly transmitted to a remote error analysis computer for evaluation. Such a remote inspection allows an early warning of the presence of an error and makes it possible to have recourse to further measures (service). This approach, however, does not yet offer an adequate criterion for detecting a manipulation.

According to British Specification 22 33 937 and U.S. Pat. No. 5,181,245, the postage meter machine periodically communicates with the data central. A blocking means allows the postage meter machine to be blocked after the expiration of a predetermined time or after a predetermined number of operation cycles and supplies an alarm to the user. For enabling, an encrypted codeword must be entered from the outside, which is compared to an internally generated, encrypted codeword. In order to prevent incorrect accounting data from being supplied to the data central, the accounting data are also incorporated into the encryption of the aforementioned code. A disadvantage is that the alarm ensues simultaneously with the blocking of the postage mater machine without giving the user a possibility of appropriately modifying his behavior in time.

U.S. Pat. No. 5,243,654 discloses a postage meter machine wherein the ongoing temporal data supplied by a clock/date module are compared to stored data about standstill times. When the standstill time is reached by the running time, the postage meter machine is deactivated, i.e. printing is prevented. When a central data station which reads the accounting data from the incrementing register is contacted, an encoded combination value is communicated to the postage meter machine and a new deadline is set, as a result of which the postage meter machine is again rendered operational. The sum total of use which contains the aggregate postage used and is read by the central data station is thereby likewise a component of the combination value transmitted in encoded form. After decoding the combination value, the aggregate amount of use is separated and compared to the aggregate amount of use stored in the postage meter machine. When the comparison is positive, the inhibit of the postage meter machine is automatically canceled. This solution achieves the desirable result of necessitating that the postage meter machine periodically reports to the central data station in order to communicate data. Instances of use are conceivable, however, wherein the volume of mail to be flanked fluctuates (seasonal operation). In these cases, the postage meter machine would be inhibited unnecessarily frequently in a disadvantageous way.

SUMMARY OF THE INVENTION

An object of the present invention is to overcome the disadvantages of prior art postage machine security systems and to achieve a significant enhancement of postage machine security without the need for unscheduled on-site inspections. A further object is to provide such a security system which permits a distinction to be made between authorized opening (service inspection) and unauthorized opening (manipulative purpose) of the postage machine, as well as to enhance the data integrity when an opening occurs. It is a further object to improve security in the communication with the central data station when data are communicated in both directions.

The above object is achieved in accordance with the principles of the present invention in a method for improving the security in a postage meter machine wherein a routine is required to be executed before the machine can operate, and the routine is capable of making a distinction between an authorized opening of the machine, such as for inspection or maintenance, and an unauthorized opening, such as for the purpose of manipulation or tampering.

The method requires that a report be made to a central data station of an intent to conduct an authorized opening of the machine in question. The machine in question establishes a communication link between the machine and the central data station, and a new code word is transmitted from the central data station to the machine. The machine requires a valid code word to be stored at a specified memory location in order to operate, and any opening of the machine automatically causes the existing code word to be erased. If a new, replacement code word has not been transmitted to the machine from the central data station in response to the aforementioned request for an authorized opening, there will be no code word to substitute for the erased code word when the machine is opened, and the machine will automatically switch to a first mode, wherein franking is not possible, and manipulation of at least some of the data registers is not possible. If a code word has been transmitted to the machine and has been stored therein prior to the opening, as is the case with an authorized opening, the new code word will be available to be substituted for the erased code word when the machine is opened, and the machine will remain operational.

The solution of the invention is based, centrally stored in on that only data centrally stored in a central data station can be adequately protected against manipulation. A significant enhancement of security is achieved by conducting a communication before every opening of the postage meter machine. Communication ensuing at more or less long time intervals also enhances the security against misuse, particularly for reloading a credit in combination with the aforementioned logging. The data to be centrally stored include at least the date, time of day, serial number or ID number of the postage meter machine and the type of data (parameters). The postage meter machine establishes the communication with the central data station.

For achieving the above objects, the postage meter machine of the invention is operable in two specific modes. One mode requires the postage meter machine to initiate communication with the central data station when selected criteria are met (sleeping mode), and the other mode potentially inhibits the postage meter machine for further use (kill mode). This inhibit can be canceled by a person authorized to do so on the occasion of the next on site inspection.

In combination with the data communication from the central data station and a signal detected by a sensor, the control unit of the postage meter machine can distinguish between authorized opening (service, inspection) and unauthorized opening (manipulative purpose).

The method for improving the security of postage meter machines includes the following steps:

a) reporting an authorized opening of the postage meter machine for the purpose of an inspection, whereby an opening request to the remote data station is made after entry into the communication mode with the remote central data station;

b) communicating a new code word to the postage meter machine from the central data station in response to the request for opening that was made and automatically erasing the current code word and replacing it with the new code word upon opening of the machine; and c) switching the postage meter machine into the first mode in order to effectively deactivate it if a valid code word is absent because the current code word was erased and not replaced with a new code word when the postage meter machine was opened.

The invention also takes into account that the financial resources stored in the postage meter machine must be protected against unauthorized access. The falsification of data stored in the postage meter machine is rendered more difficult to such an extent that the outlay is no longer rewarding for a manipulator.

Commercially available OTP (one-time programmable) processors can contain all security-relevant program parts in the interior of the processor housing, particularly message authorization codes (MAC). MAC information can thus be appended to the security-relevant register data and the difficulty of manipulations at the postal registers can thus be maximally increased.

The security-related portions of the program also include sub-routines for flow supervision, which monitor the executed program routines. Malfunctions of the microprocessor or manipulations undertaken with a fraudulent intent can thus be discovered. Specific calculating operations permit a check to be made as to which program routines were used, and how often.

Another security measure which can be included in the sequence of the first mode, in addition to or instead of distinguishing between an unauthorized and an authorized opening of the postage meter machine (kill mode 0), is to monitor the running time of the program of selected security-related programs or routines in a Time Supervision Mode (kill mode 1 ). Given a deviation of the running time of the programs or routines from a predetermined running time, as will occur in the event of a manipulation, the machine is determined to be suspicious. The predetermined running time can simply be a fixed duration, or can be the result of monitoring of the program execution with an emulator. In the event that the machine is determined to be suspicious, the microprocessor or OTP can erase the code word which is stored in the non-volatile memory.

Based on the fact that the printer head cannot be used without a conveyor means in order to produce an uncharged postmark, the conveying speed or the printing speed are monitored. Given thermal transfer printers, the conveying speed of the postal matter is proportional to the ribbon speed of the inking ribbon that is measured by an encoder. The printing speed is barely reduced by the duration of the required system routine for securing the postage meter machine in the operating mode. This is accomplished by creating a time reserve during printing by the microprocessor of the control means that implements the column-by-column embedding of window data. The method of the invention, however, is not limited to such fast postage meter machines. The decisive factor is the monitoring of the printing speed for potential deviations in the chronological sequence produced by manipulations in order also to prevent a manipulation of the printer control signal in addition to the other security measures already undertaken.

The postage meter machine can enter into the second mode from the system routine on the basis of a decision criterion in order to forward a warning and a request to the user of the postage meter machine to communicate with the central data station. At the same time, the behavior of the user of the postage meter machine is also monitored by the central data station on the basis of previous data communicated during a communication event.

In the postage meter machine, a sleeping mode counter is set to a specific number of items at the time of every communication with the central data station and is initiated to decrement further at every franking, i.e. during the course of an accounting and printing routine, until a count of "zero" has been reached. The specific number of items can be calculated both in the postage meter machine as well as in the central data station and can be communicated to the postage meter machine via a communication connection.

In order to improve the security of postage meter machines using only one microprocessor and a suitable program, a user-specific information sequence regarding the use of credit is identically present simultaneously in the central data station an in the postage machine. This sequence forms a first calculating basis in order to check data about the use of credit and about the reloading of credit stored in the central data station to evaluate their plausibility. Another calculating basis of the invention on the basis of further data, particularly in combination with the number of items since the last communication, flags the need for an unscheduled on site inspection of any postage meter machine which has repeatedly failed to report in time at the central data station.

The postage meter machine that receives a regular reloading of credit and is thereby inspected can thereby be classified as "non-suspect." A postage meter machine that continues to be operated without inspection beyond a predetermined inspection date, however, need not necessarily have been tampered with. On the contrary, the volume of mail to be processed by the postage meter machine can have diminished to an unusual extent. When adequate remaining credit is available in the postage meter machine, of course, franking can continue to be carried out. Only an unscheduled on-site inspection can permit a conclusion to be made with certainty as to whether a tampering is present in this case.

For inspecting suspicious postage meter machines, the central data station informs the postal authority or the institution authorized to make the inspection, of the serial number of the postage meter machine in question. The volume of mailings (letters) of specific users which have been so identified can be monitored, by monitoring the number of mailings over a time interval of, for example, ninety days.

During an inspection, the seal of the postage meter machine is checked for integrity and the machine itself is then checked. Operations may possibly have to be performed on the postage meter machine in the case of a repair or as a result of onsite service. The registers of the postage meter machine are interrogated as a preparation for such an operation in order to identify the type of required operation, The type of operation and the registered data are then communicated to the data central and a communication of data from the data central to the postage meter machine ensues corresponding to a requested, authorized operation performed on the postage meter machine, which is logged as a permitted operation. The postage meter machine is capable of distinguishing between requested, authorized operations and unauthorized operations performed on the postage meter machine on the basis of the control unit of the postage meter machine in combination with the data communicated from the data central. In the event of an unauthorized operation being performed on the postage meter machine, this operation is logged as an error but the original operation condition is restored with the aforementioned, communicated data after an authorized operation on the postage meter machine has been performed.

When an operation was performed on the postage meter machine in an unauthorized fashion, this leads to the loss of predetermined data, If thus, a manipulator performs an unauthorized operation, the postage meter machine is effectively shut down by switching the postage meter machine into the first mode.

Another security measure that can be implemented in the second mode in addition to or instead of a sleeping mode version is the error overflow mode. This retards the reaction time span of the postage meter machine when a predetermined number of errors is exceeded and informs the operator of the postage meter machine of this condition via the display. If the condition of exceeding the number of errors is not eliminated, for example within the framework of an inspection by service personnel or by resetting during communication with the data central, the reaction time span can be lengthened further in order to make potential manipulations more difficult.

The method for improving the security of a postage meter machine that is capable of communication with a remote data central and which includes a microprocessor in a control means of the postage meter machine also includes the steps of forming a checksum in the OTP processor regarding the content of the external program memory and comparing the result to a predetermined value stored in the OTP processor after execution of the franking mode and/or the operating mode. These steps can be undertaken during the initialization, i.e. when the postage meter machine is started, or at times when printing is not being carried out, i.e. when the postage meter machine is being operated in the stand-by mode. A logging and subsequent blocking of the postage meter machine ensues in the event of error.

DESCRIPTION OF THE DRAWINGS

FIGS. 2A and 2B are flow charts respectively illustrating two versions of the basic method of the invention.

FIG. 7 is a flowchart showing the procedure for substituting a new code word, if necessary.

FIG. 8 is a flowchart showing a procedure for identifying a branch of the program routine in which an abnormality has occurred.

DESCRIPTION OF THE PREFERRED EMBODIMENTS

Figure 1A:
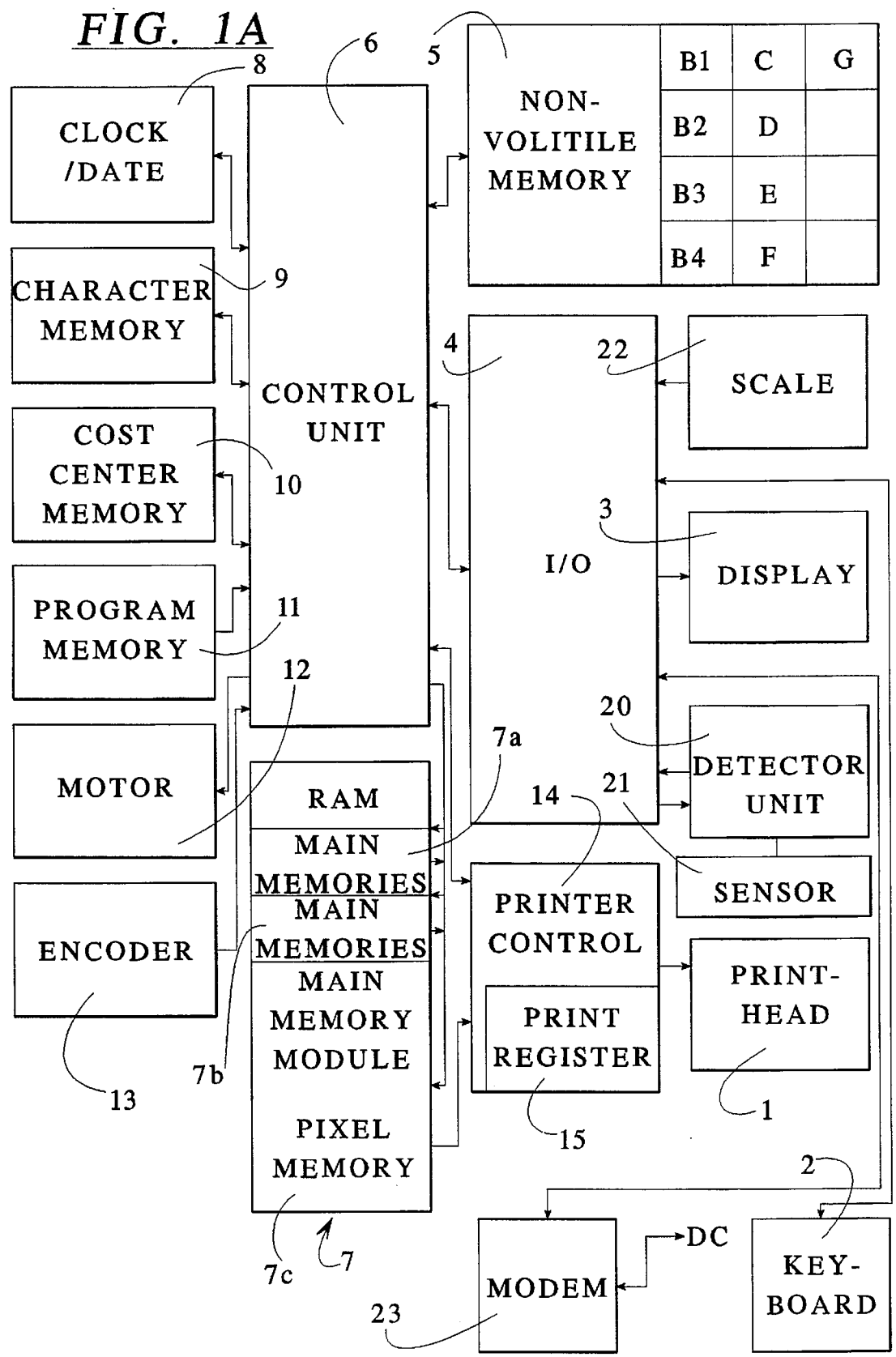
FIGS. 1A and 1B respectively show block circuit diagrams of a postage meter machine having enhanced security.
Figure 1B:
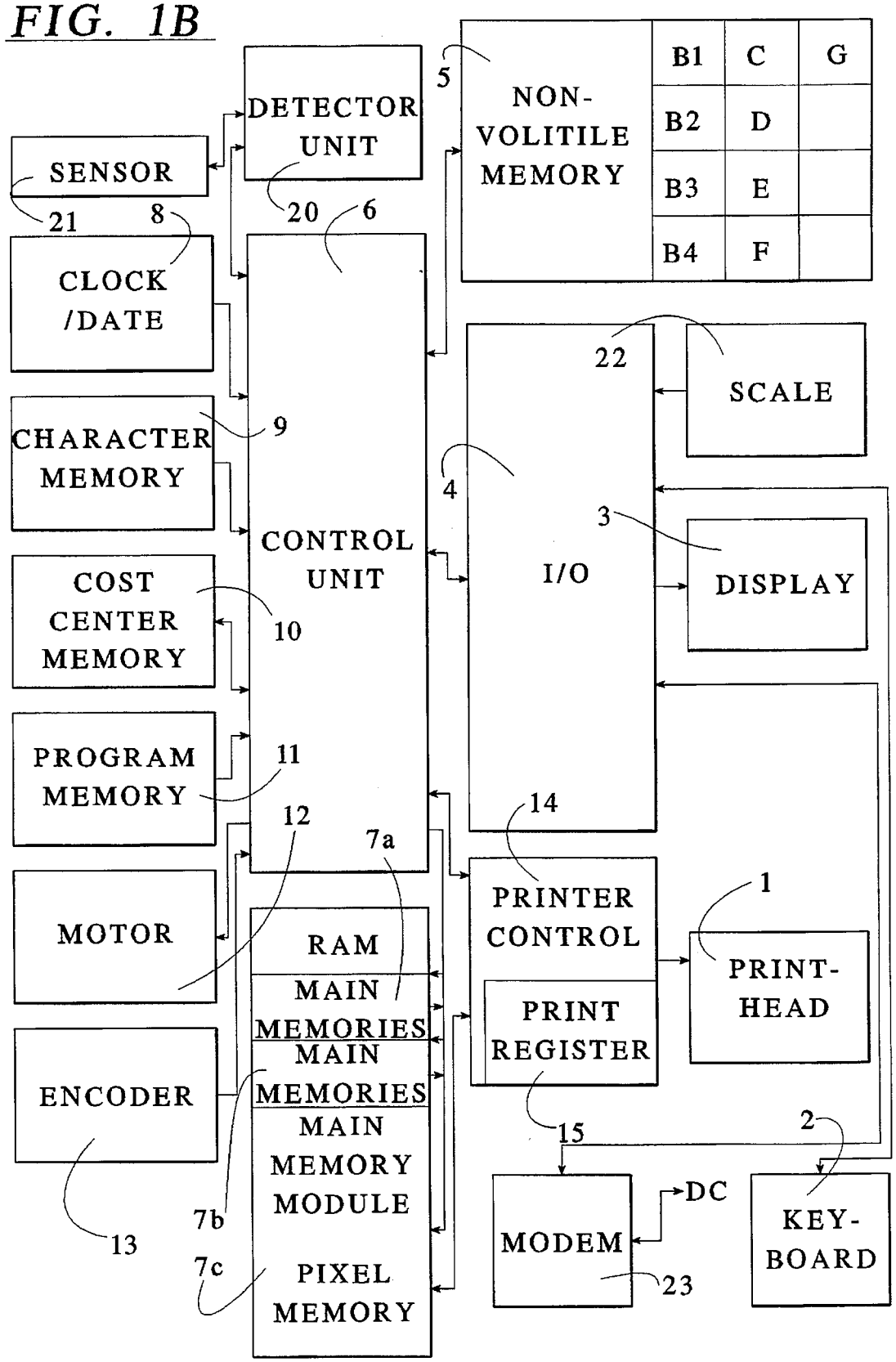

FIGS. 1A and 1B show a block circuit diagram of different embodiments the postage meter machine of the invention. Both embodiments include a printer module 1 for a fully electronically produced franking format, at least one input unit 2 having a plurality of actuation elements, a display unit 3, a sensor 21 that detects attempted openings, and a modem 23 that establishes communication to a central data station. All of these components are connected to a control unit 6 via an input/output control module 4 a non-volatile memory 5 for the variable of the franking format and a non-volatile memory 11 for the constant parts of the franking format.

A character memory 9 supplies the necessary printing data to a volatile main memory module 7. The control unit 6 is a microprocessor μP that is in communication with the input/output control module 4, the character memory 9, the volatile main memory module 7, the non-volatile memory 5, a cost center memory 10, a program memory 11, a motor 12 for a conveyor or tape feeder means, an encoder (coding disc) 13, as well as with a clock/date module 8. The individual memories can be in a plurality of physically separate modules or can be combined in a few modules.

In FIG. 1A, the sensor 21 supplies a signal to a detector unit 20 which, after the postage meter machine is switched on, is loaded with a code word Y by the input/output control module 4 under predetermined conditions This code word Y is read out during the operation of the postage meter machine and is checked for validity. The manner by which the detector unit 20 is loaded with the code word Y shall be set forth below with reference to FIG. 1C in combination with the flow chart of FIG. 2A.

Figure 1C:
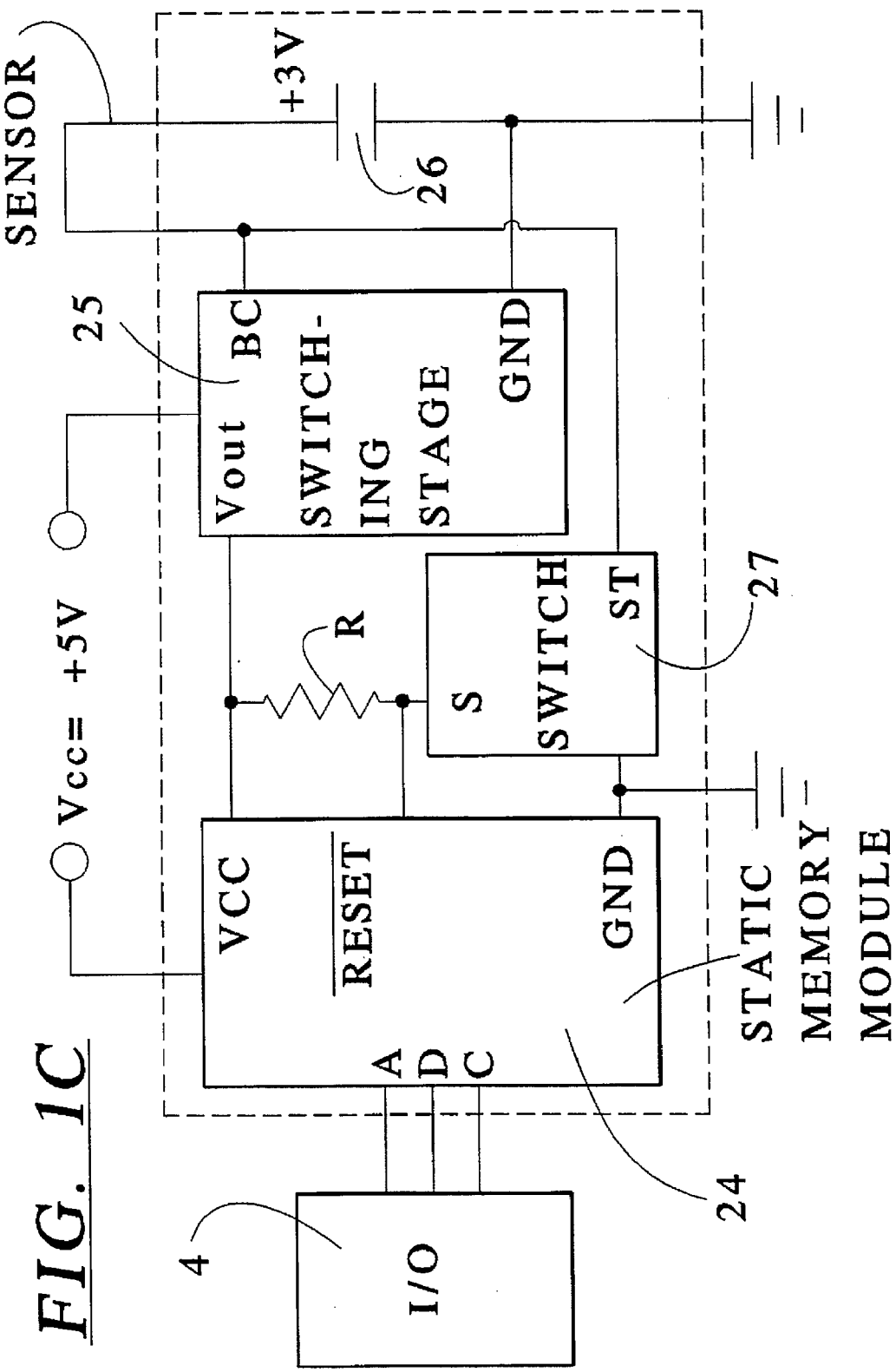
FIG. 1C is a circuit diagram of a detector circuit for identifying an opening of the housing constructed and operating in accordance with the principles of the present invention.

FIG. 1C shows a circuit diagram of a detector unit 20 for identifying an opening of the housing. This detector unit 20 has at least one static memory module 24 (SRAM) for the code word Y, a switching stage 25 and a primary battery 26, particularly a lithium cell.

The switching stage 25 connects a power pack output voltage $V_{cc}=+5$ V to the SRAM 24 when the postage meter machine is switched on. When the postage meter machine is switched off, or the power supply is interrupted, then the SRAM 24 is supplied with, preferably, a voltage of +3 V from the primary battery 26. The memory contents are thus preserved in the SRAM until the voltage supply is set by the sensor 21 or by the primary battery 26.

In a preferred version, the a sensor 21 is an electrically conductive strip that produces the contact between the long-term battery (lithium battery) and the equipment to be supplied. The static memory module 24 is preferably a CMOS-SRAM. A switch 27 is connected to ground and, via a resistor R, is connected to the supply voltage delivered by the switching stage 25.

A tap between the resistor R and the switch 27 is connected to the reset input of the memory module 24 for the code word Y. For example, the switch 27 can be an npn-transistor with its collector connected to the reset input and its emitter grounded. Its base is connected via an impedance converter to the BC input of the switching stage 25 which is connected to the positive pole of the battery 26 via the sensor 21. The switching stage 25 is preferably a commercially available bq 2201 module and supplies a power pack voltage $V_{cc}=+5$ V during operation of the postage meter machine and supplies a battery voltage of +3 V during non-operation thereof in order to preserve the memory contents. When the sensor 21 is activated during non-operation, the voltage for preserving the memory contents is absent. When the sensor 21, however, is activated during operation, the memory contents are erased via the reset input.

In a modified version that is not shown in FIG. 1C, the sensor 21 can alternatively interrupt a different connection, causing the detector unit 20 to react. Such an electrically conductive strip can be individually manually placed differently for each machine. The only critical requirement is that any and all opening of the housing moves the strip and thus interrupts the aforementioned contact.

The strip, for example, can be initially loosely placed during assembly and can be drawn taut only after assembly or shortly before the ultimate closing of the housing shells, so that the aforementioned contact is produced at that time.

An advantageous, further sensor modification is to fashion the housing shells as a safety cap seal.

The safety cap seal is fashioned with serpentine interconnects through which a low monitoring current, or charge-preserving current flows for a CMOS-RAM. Every opening leads to interruption of the current, resulting in a loss of stored information that a tamperer cannot replace. After the housing is closed, the system routine prevents the machine from proceeding into the franking mode.

FIG. 1B shows a second version having a detector unit 20 directly coupled to the microprocessor of the control unit 6, this detector unit 20 being influenced by the sensor 1, which can be realized in different ways as described above.

A further version of the detector unit 20, employs a programmable logic array which can be influenced by the sensor 21. Within the detector unit 20, the sensor 21 effects a different program branch during the execution of the system routine. After the housing is closed, the system routine then again prevents the machine from proceeding into the franking mode.

FIG. 2A shows version 1 for a flow chart of a postage meter machine having a security system according to the solution of the invention. A step 210 (erase old code Y) always occurs during operation and non-operation of the postage meter machine when an opening of the postage meter machine is identified by a sensor 21.

After the postage meter machine is switched on in step 100, a function test with subsequent initialization is subsequently undertaken within a start routine 101.

Figure 5:
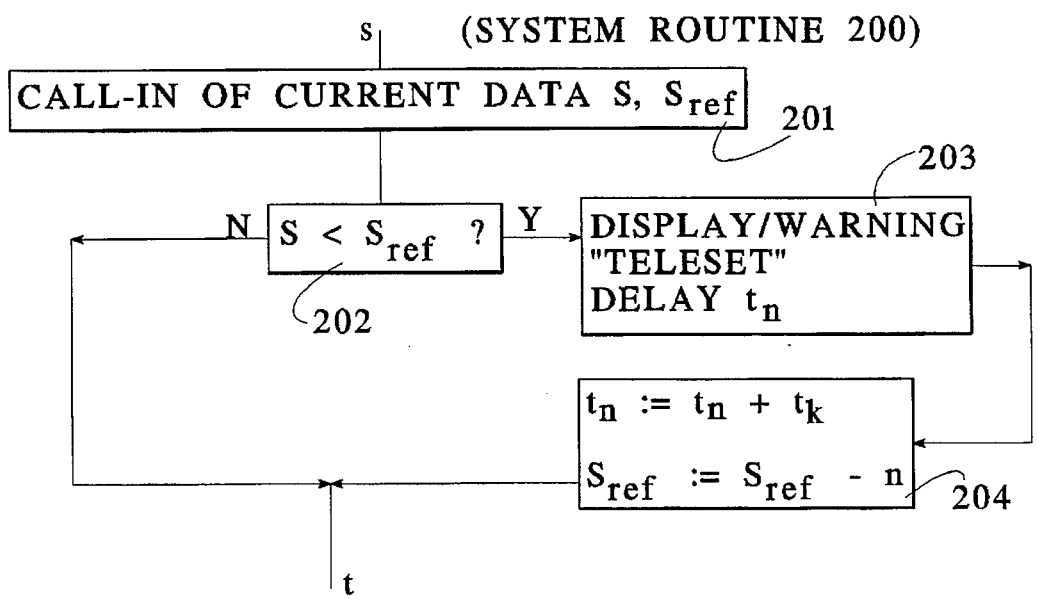
FIG. 5 is a flow chart of a embodiment of the first sleeping mode.

In the following step—covering a plurality of sub-steps 102–105 shown in greater detail in FIG. 7—, a new valid code word Y' is copied into the memory location of the former code word Y (step 103) if a valid code word Y is no longer stored there. (Y' can be simultaneously erased in memory E or can be subsequently erased in a separate step 105 indicated in parenthesis because step 105 can optionally be subsumed in step 103.). Such copying can take place, however, only if such a new code word Y' exists in another, predetermined memory location E of the non-volatile memory 5 according to step 102. The necessity of substituting a new valid code word Y' arises in the case of an authorized as well as in the case of an unauthorized opening because the former code word Y is automatically erased upon every opening of the housing. As described below, the new code word Y' can only be entered into the memory location E in a manner which affords a high degree of security that the person requesting or making the entry is authorized to do so. Given non-opening, copying is not carried out and the former code word is preserved in the memory 20 according to step 104. The system routine 200 is reached at point s. This includes a plurality of steps 201–215 of the security system. The call-in of current data ensues in step 201, which is set forth in greater detail below for the sleeping mode in conjunction with the explanation of FIGS. 5 and 6.

As shown in FIG. 2A, a check is subsequently made in step 202 to determine whether the criteria for entry into the sleeping mode are met. When this is the case, a branch is made to step 203 in order to display at least one warning with the display unit 3. Further steps 204–206 can be traversed before a branch is made to step 207. When this is not the case, a branch is likewise undertaken to step 207. Point t is reached in every case after 202–206 steps.

As set forth in greater detail in European application bearing serial number 93103951.5, at least one register check of the data structure of the postal registers is implemented in step 207 in order to log the errors. Moreover, measures are undertaken in step 208 to inhibit the postage meter machine given register data structure errors.

Of course, a tamperer who breaks into the postage meter machine can carry out such a manipulation in order to modify the postal register in a self-serving fashion. This manipulation could only be discovered at the next remote interrogation of the register in combination with the data of the central data station—if it is not previously canceled, since a tamperer will attempt to erase the traces of his presence. It is therefore inventively provided that at least one further check ensues to determine whether a valid code Y is present in the predetermined memory location of the unit 20. When this is not the case, a branch to step 208 is undertaken.

For example, the check for a valid code Y is implemented on the basis of a selected checksum procedure within an OTP processor (one-time programmable) that internally contains the corresponding program parts and MAC (Message Authentification Code) stored, for which reason the tamperer cannot duplicate the nature of the checksum procedure. Other security-relevant cryptodata and sequences are also exclusively stored in the interior of the OTP processor in order to place a MAC safeguard over the postal register.

In general, it is determined whether a valid code word is present in the postage meter machine by interrogating a predetermined memory location to obtain the contents of the predetermined memory location, and the contents of the predetermined memory location are subjected to a checksum analysis in a one-time programmable processor. The valid code word can be stored in the predetermined memory location protected by a message authentification code (MAC), and the one-time programmable processor detects and decodes the MAC. Alternatively, it can be determined whether a valid code word is present in the postage meter machine by interrogating a predetermined memory location to obtain the contents thereof, storing a coded key having parts thereof stored in respectively different memory locations, and analyzing the contents of the predetermined memory location using a checksum analysis and the coded key.

Figure 4A:
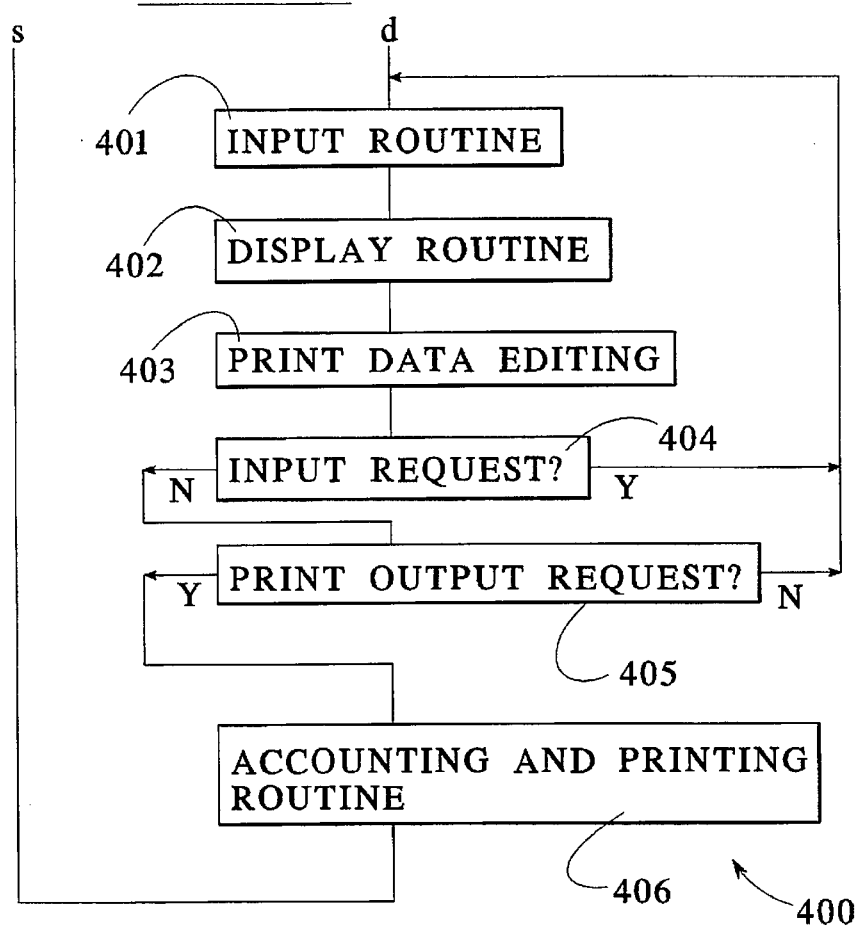
FIGS. 4A and 4B are flow charts respectively illustrating two versions of the franking mode in accordance with the principles of the present invention.
Figure 4B:
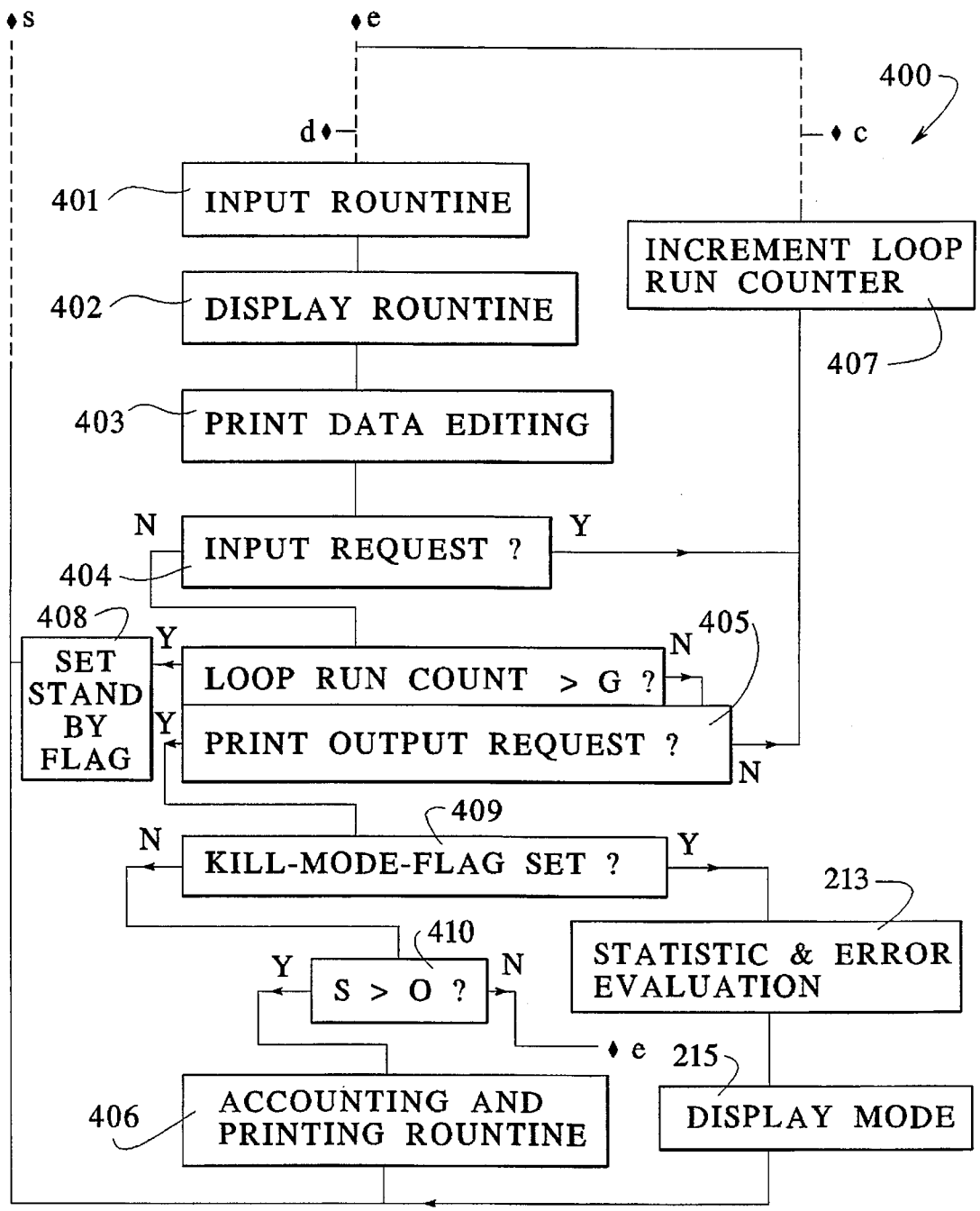

Another version of the security which does not need an OTP processor is to make the detection of the keys more difficult by the encoding thereof and partial deposit thereof in different memory areas. MAC are again attached to every information packet in the security-relevant registers. Tampering of the registered data can be recognized by monitoring via the MAC. This routine ensues in step 406 in the franking mode which is shown in FIGS. 4A and 4B. The difficulty of manipulating the postal registers can thus be maximally increased.

In general, accounting data, regarding funding of the postage meter machine, are stored in a number of postal registers, the system routine is caused to place the postage meter machine in a kill mode, wherein any flanking is inhibited, in the absence of a valid code word in the postage meter machine, and in the kill mode, the contents of the postal registers are partially erased in a predetermined manner, thereby causing the postage meter machine to enter into a display mode after conducting a statistical error evaluation. A message authentication code (MAC) can be appended to all data in the postal registers as well as to the valid code word. In the franking mode, a check to determine whether the data in the postal registers has been manipulated can be made by checking the MAC in an accounting and printing routine in the franking mode.

In another version, for conducting franking in the franking mode, an item is conveyed at a conveying speed beneath the print head 1 for making a franking impression on the item, and the conveying speed of the item is monitored, such as by means of the encoder 13, as indicative of the occurrence of each franking impression. The encoder 13 measures the conveying speed and produces encoder pulses indicative thereof, and the control unit 6 can measure (count) the number of encoder pulses which occur during a time window, and the conveying speed can be adjusted if the number of encoder pulses in the time window deviates from a specified number. The time window can be defined by a crystal-controlled clock generator, such as the clock date module 8, in the postage meter machine.

An error can be logged if the number of encoder pulses within the time window deviates from the specified number by a specified deviation, and a count of these errors can be accumulated, and the postage meter machine disabled, if the error count exceeds a predetermined error count value.

As an alternative to monitoring conveying speed, in a postage meter machine wherein franking is conducted in the franking mode by making a franking impression on a item by moving an inking ribbon at a ribbon speed beneath a thermal transfer printer, the ribbon speed can be measured with an encoder which produces encoder pulses indicative of the ribbon speed. The number of encoder pulses indicating the ribbon speed which occurred during a time window can be measured (counted) and the ribbon speed can be adjusted if the number of encoder pulses in the time window deviates from a specified number. As in the monitoring of item conveying speed, an error can be logged if the number of encoder pulses indicative of ribbon speed within the time window deviates from the specified number (related to ribbon speed) by a specified deviation, and a count of these errors can be accumulated and the postage machine disabled if the error count exceeds a predetermined value.

The franking impression can be generated by the thermal transfer printer by means of column-by-column printing, and a chronological duration for printing each column in which variable data are present can be compared to a specified chronological duration. The postage meter machine can be inhibited dependent on a number of times for which the specified chronological duration is exceeded.

The kill mode is reached with step 208 and the postage meter machine is inhibited. In step 208, the postal registers are preferably partially erased in a predetermined way. The display mode 215 is reached via step 213 and a branch is then made back to the system routine. The inhibiting can advantageously ensue in that the branch to the franking mode 400 is no longer implemented.

Figure 2B:
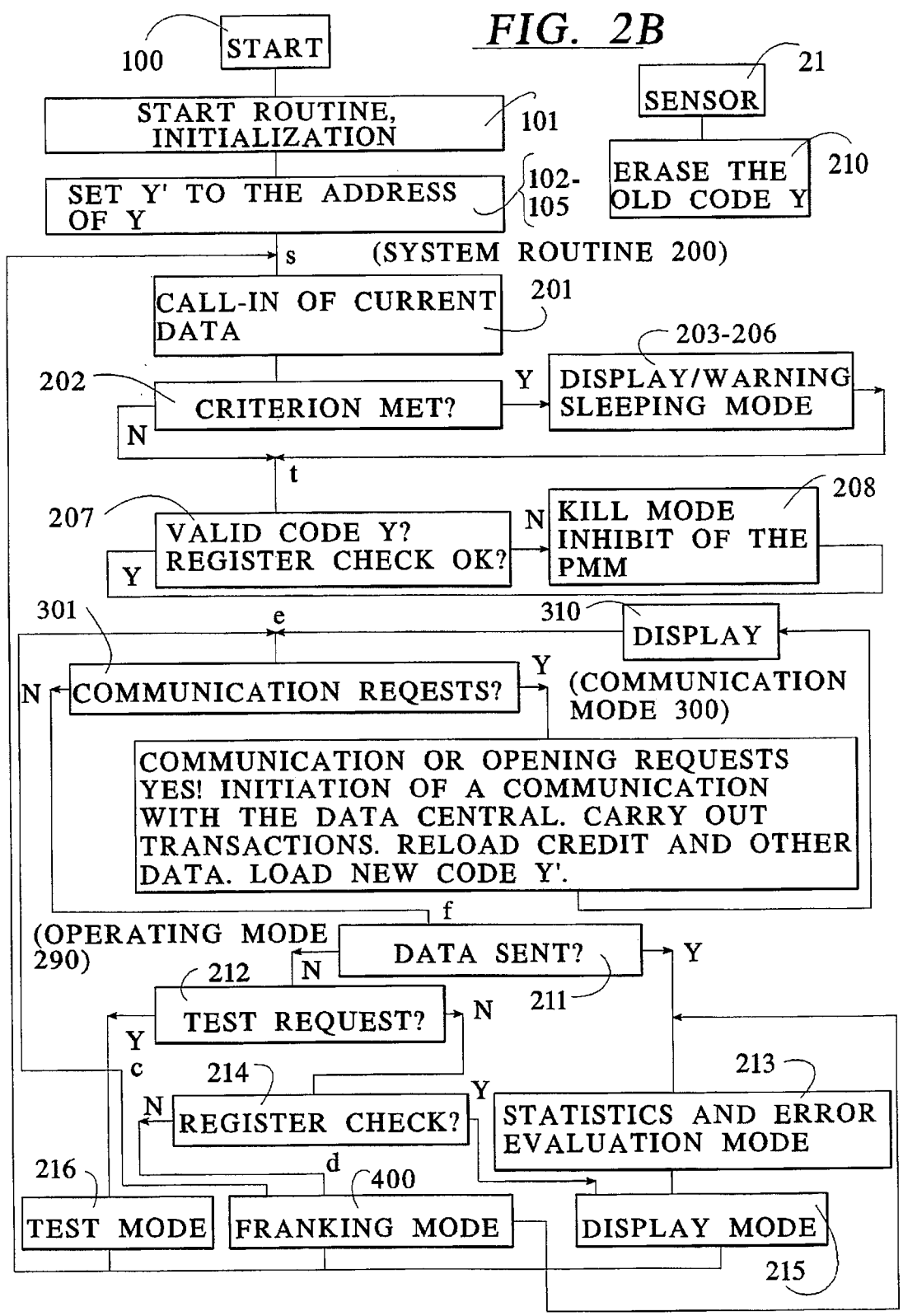
Figure 3A:
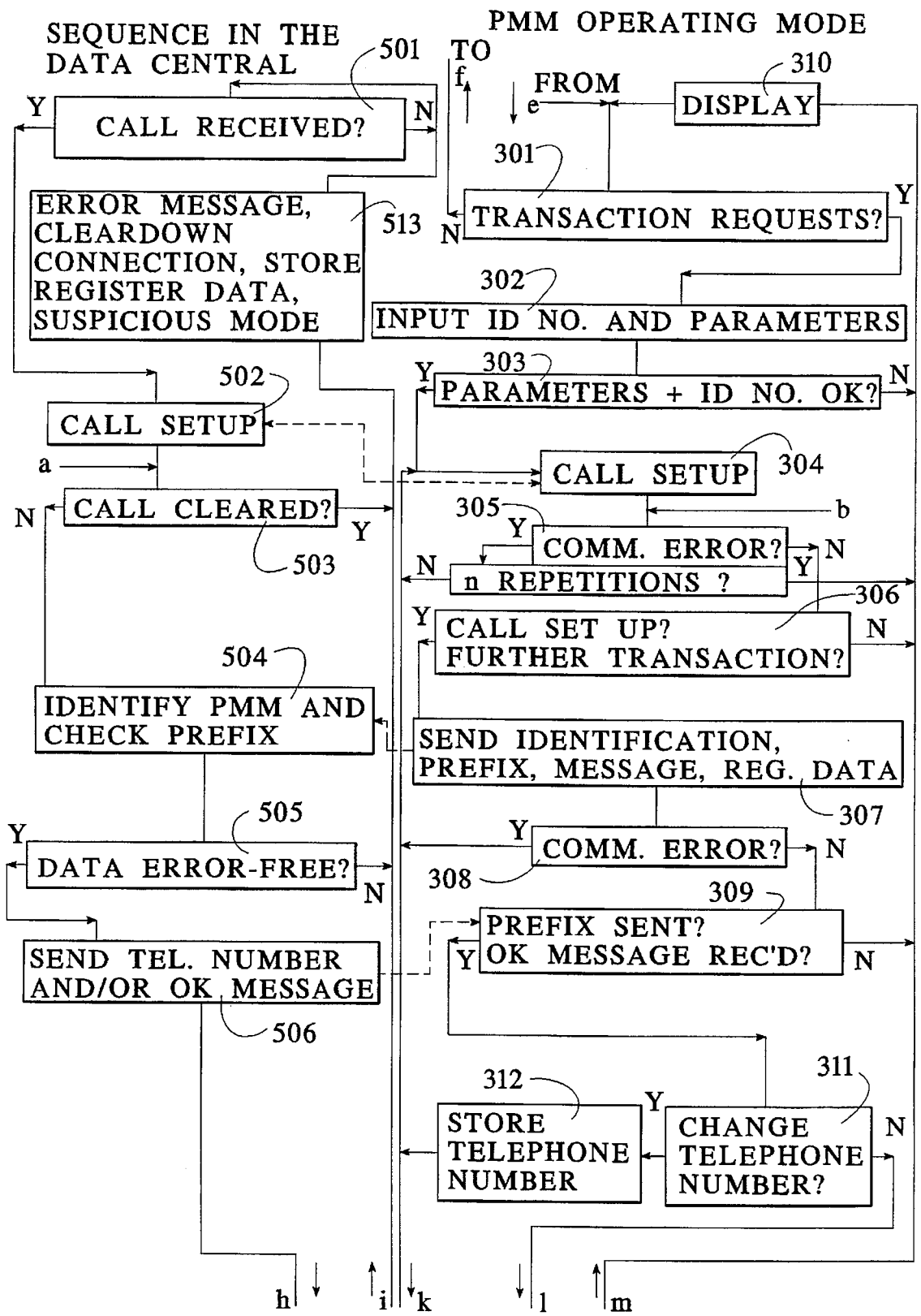
FIGS. 3A and 3B are flow charts respectively illustrating of the security procedures of the postage meter machine and central data station in the communication mode in accordance with the principles of the present invention

At the conclusion of the test in step 207 without relevant deficiencies having been identified, the point e, i.e. the beginning of a communication mode 300, has been reached and an interrogation is undertaken in a step 301—shown in FIGS. 2A, 2B and 3A—to determine whether a transaction request is present. When this is not case, the communication mode 300 is departed and the point F, i.e. the operating mode 290 is reached. When relevant data were communicated in the communication mode, then a branch to step 213 is to be made for data evaluation. When non-communication was identified in step 211, then a branch is made to step 212. A check is now carried out to determine whether appropriate inputs have been undertaken in order to proceed into the test mode 216 given a test request 212, or in order to proceed into a display mode 215 in an intentional register status check 214. When this is not the case, the point d, i.e. the franking mode 400, is automatically reached.

It is also inventively provided that a statistical error evaluation is implemented in step 213 in order to acquire further current data that, after branching to the system routine 200, can likewise be called-in in step 201.

When the housing of the postage meter machine is opened by persons authorized for this purpose, a written, possibly telephoned, report in the data center is required for authorizing the opening. This report communicates the date of the opening and the time of day of the approximate start of the opening. Before the postage meter machine can then in fact be opened, a communication must be undertaken via modem with the data canter in order to request the authority to open and in order to load a new, future code word Y' that can replace the current code word.

Figure 3B:
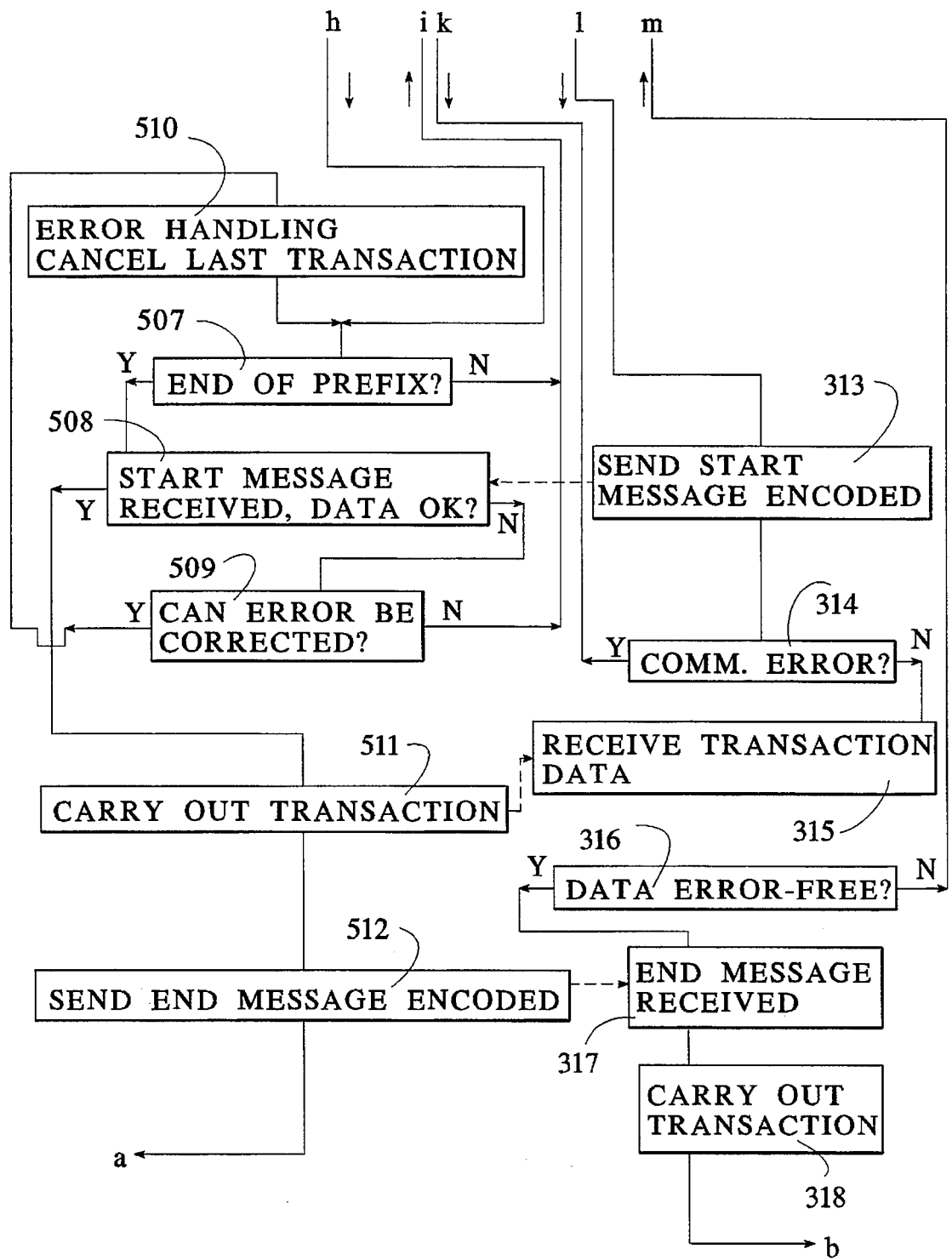

FIGS. 3A and 3B respectively show the security sequences of the postage meter machine in the communication mode and the security sequences of the central data station in the communication mode.

When point e, i.e. the beginning of the communication mode 300 set forth below, is reached, a query is made in a step 301 (shown in FIGS. 2A, 2B and 3A) to determine whether a transaction request is present. Such a request can be made, for example, for reloading credit, for changing the telephone number, etc.

The user selects the communication mode or remote value prescription mode of the postage meter machine by entering the identification number (eight-place postage call-in number). It is now assumed, for example, that the communication is to ensue in order to load a new, future code word Y' that can replace the current code word. When such a transaction request is made, the prescribed amount is zero because the credit in the postage meter machine does not have to be augmented with a zero value credit in this case.

In step 302, an entry of the identification number (ID number) and of the intended input parameter can ensue in the following way. The ID number can be the serial number of the postage meter machine, a PIN or a PAN (postage call number) that is acknowledged by actuation with a predetermined T-key of the input unit 2. The input parameter (prescribed value) used in the most recent remote evaluation (reloading) appears in the display unit 3, which is now to be overwritten or retained by, entering the requested input parameter. The input parameter is a matter of a numerical combination which is interpreted in the data central as a request to communicate a new code word Y' when an authorization to open the machine had been previously obtained. The display can be erased by pressing a C-key given an incorrect entry of the aforementioned input parameter.

For example, a change is entered in order to load a credit having the value of zero in a transaction but an authorization to open the machine is not previously obtained. The input parameter thus serves only as new prescribed value. The credit for flankings is thereby not increased in value when the input parameter has the value zero nor is a new code word loaded, however, a piece number S' can be communicated during each communication with the data central.

Only on the basis of a prior contact, for example with a separate call to the data central or in some other form of communication, the data central is informed that a new code word Y' is to be communicated to the postage meter machine when a transaction for the value zero is subsequently started on the part of the postage meter machine within a predetermined time span. The request to open the machine is only considered to have been lodged when, after the reporting of an authorized opening, the postage meter machine enters into the communication mode effected in this way.

If however, an arbitrary, different input parameter is previously effected with the data central, the reloading of a new, future code Y' ensues upon entry of this input parameter in addition to the reloading of the credit corresponding to the prescribed value input with the input parameter, and also ensues during an additional transaction.

When an input parameter other than the declared parameter is entered, the result thereof is only the reloading in the amount of the selected, new prescribed amount.

When the requested input parameter has been properly displayed, this is confirmed by renewed actuation of the predetermined T-key of the input unit 2. A presentation corresponding to a change of input parameter or corresponding to the unchanged (old prescribed value) then appears in the display unit 3.

The change of the input parameter is started via modem connection by actuating the predetermined T-key. The entry is checked (step 303) and the rest of the procedure sequences automatically, whereby the execution is accompanied by a corresponding display.

To that end, the postage meter machine checks whether a modem is connected and operational. When this is not the case, a branch is made to step 310 in order to indicate that the transaction request must be repeated. Otherwise, the postage meter machine reads the selective parameters, composed of the selection parameters (main office/branch, etc.) and the telephone number, from the NVRAM memory area F and transmits these with a selection request command to the modem 23. Subsequently, the call establishment required for the communication with the central data station via the modem 23 ensues in a step 304.

The left half in FIG. 3A likewise shows the execution in the data central that ensues parallel and that is necessary for the communication. A constant check is carried out in step 501 to determine whether a call to the data central has ensued. When this is the case and the modem 23 has dialed the communicating party, the call set up also ensues parallel in the data central in step 502. Constant monitoring is carried out in step 503 to determine whether the connection to the data central has been cleared down. When this is the case, a return to step 501 ensues in step 513 after an error message.

Parallel thereto, monitoring is undertaken in the postage meter machine in step 305 to determine whether communication errors have arisen and, if necessary, a return to step 304 is undertaken in order to establish the connection again on the part of the postage meter machine. When it is confirmed in the postage meter machine in step 306 that the connection is established and a transaction should now ensue, a branch is made to step 307 in order to send an opening message or identification data, prefix data or register data. Given (in step 308) the occurrence of a communication error, a branch is made back to step 304. Otherwise, an opening message is sent from the postage meter machine to the central data station and a branch is made to step 309. Among the things contained, in this message are the postage-fetching number for identifying the calling party, i.e. the postage meter machine, at the central data station.

This opening message is checked for plausibility in the central data station in step 504 and is further evaluated by subsequently making another check in step 505 to determine whether the data were communicated error-free. If this is not the case, a branch ensues back to step 513 for error reporting. If the data are error-free and it is found in the central data station that the postage meter machine has made a request to be opened and requests a new code word Y', then a reply message is sent as a prefix message to the postage meter machine in step 506. A check is carried out in step 507 to see whether the prefix message including the end of the prefix had been sent in step 506. If this is not the case, then a branch is made back to step 513.

A check is made in the postage meter machine in step 309 to determine whether a prefix message has been sent as reply message or has been received in the interim by the central data station. If this is not the case, a return to the step 301 is made for display and a transaction request is subsequently again interrogated in step 301. When a message was received and the postage meter machine has received an "OK" message, a check of the prefix parameters ensues in step 311 to determine if a change of telephone number is present. When an encoded parameter was communicated, there is no change in telephone number and a branch is made to step 313 in FIG. 3B.

FIG. 3B shows the security sequences of the franking machine in its communication mode and, parallel thereto, those in the central data station.

In step 313, a beginning message is sent encoded to the central data station from the franking machine. In step 314, the message is checked for communication errors. If a communication error exists, a branch is made back to step 304 and another attempt ensues to establish the connection to the central data station in order to send the beginning message in encoded fashion.

This encoded beginning message is received by the central data station when the prefix message had been completely transmitted in step 506 and the end of the prefix message had been communicated in step 507. A check is made in the central data station in step 508 to determine whether the central data station received the beginning message and to determine whether the data are OK. If this is not the case, a check is made in step 509 to determine whether the error can be eliminated. If the error cannot be eliminated, a branch is made to step 513. Otherwise, error treatment is undertaken in step 510 and a branch is made to step 507. When the reception of correct data is determined in step 508, the central data station begins to implement a transaction in step 511. In the aforementioned example, a new code word Y' is transmitted encoded to the postage meter machine which receives the transaction data in step 315.

The data are checked in the following step 316. If an error is present, a branch is made back to step 310. Otherwise, a wait for the end message is implemented, the central data station transmitting this end message encoded to the postage meter machine in step 512. After the reception of this end message in step 317, the transaction is likewise implemented in the postage meter machine in the step 318. The new code word Y' is now present by being stored in the postage meter machine and a branch is made back to step 305. When no further transaction is to ensue, step 312 for display and, following thereupon, step 301 are reached.

When a transaction request is not made, a check is made in step 211 to determine whether data have been communicated. When data were communicated, step 213 has been reached. Corresponding to the input parameters, the postage meter machine places the new code word Y' in, for example, the memory area E of the non-volatile memory 5. If, however, a different numerical combination is entered in step 302 as an input parameter and the input was OK (step 303), establishment of a call ensues (step 304). If a connection is present set up without errors (step 305) an identification and prefix message is sent to the central data station (step 306). Among other things, the postal-fetching number for the identification of the postage meter machine at the central data station is again contained in this opening message.

When the data are error-free (step 505) the central data station recognizes from the numerical combination that has been entered that the current telephone number is to be stored in the postage meter machine. In step 506, a reply message, having fields identifying that the telephone number is to be charged and the current telephone number, is sent from the central data station unencoded. The postage meter machine, which receives this message, recognizes in step 311 that the telephone number is to be changed. A branch is now made to step 312 in order to store the current telephone number. Subsequently, a branch is made back to step 304. If the connection is still established and a communication error is not present (step 305), a subsequent check is made in step 306 to determine whether a further transaction is to ensue. If this is not the case, a branch is made to step 301 via the step 310.

After the current telephone number has been stored, the postage meter machine automatically establishes a new connection to the central data station using the new telephone number. The actual transaction intended by the user, i.e. a remote prescription of the value of the new code word Y' or a credit reloading, is thus automatically implemented, i.e. without a further operation on the part of the user of the postage meter machine. A corresponding message appears in the display to the effect that the connection is automatically re-setup due to the change in telephone number.

The housing of the postage meter machine is subsequently closed after a service or repair operation, and that the postage meter machine is switched into communication mode 300 after the housing is closed. The authorized person can also communicate the end of the check to the data central.

A communication event can include the storing of a telephone number as well as the reloading of a credit. A plurality of transactions can thus be made without interrupting the communication event. Only one transaction is necessary when the amount of the credit to be reloaded is to remain the same as the amount in the most recent reloading of credit. This ensues in the same way as when reloading a new code word Y'. If, however, the amount of the credit to be reloaded is to be modified, two transactions are required. Both transactions ensue in the same way as when reloading the new code word Y'. A message is communicated during a transaction. Each communicated message is individually encoded.

A successful transaction takes place in the following sequence. The postage meter machine sends its ID number and a prescribed value for the amount of the desired credit to be reloaded together with a MAC to the central data station. The latter checks a message communicated in this way against the MAC in order then to send an OK message (possibly MAC-protected) to the postage meter machine. The OK message no longer contains the prescribed value.

The communication of a new code word Y', a change in the amount of the reloaded credit and a new reloading credit ensue in encoded form, but the communication of telephone numbers ensues in unencoded form. When it is found in the central data station that the connection to the postage meter machine has been cleared (step 503) or there are faulty data (step 505) or errors (step 509) that cannot be eliminated or that no end of prefix had been sent (step 507), the communication event is ended. The clearing of the communication connection, the storing of the communicated data and the evaluation thereof ensue in step 513 on the part of the central data station following an error message.

A transaction request leads to a specifically protected reloading of credit in the postage meter machine. Safeguarding of the postal register present outside the processor in the cost center memory 10 preferably also ensues with a time control during the reloading of credit. If, for example, the postage meter machine is observed to have an emulator/debugger, then it is probable that the communication and accounting routines will not sequence within a predetermined time. A part of the DES key is modified when this is the case, i.e. when the routines require substantially more time. The data center can identify this modified key during a communication routine and can subsequently report the postage meter machine as being suspect as soon as a beginning message is sent encoded according to step 313.

It is found in step 509 in the central data station that the error cannot be eliminated. The central data station can then not implement any transactions (step 511) because a return to step 513 was undertaken. Since no data were received in the postage meter machine in step 315, the transaction did not ensue error-free (step 316). A return to step 301 is then undertaken via the step 310 in order to check again following a display whether a transaction request continues to be made.

When this is not the case, the communication mode 300 is departed and the point f, i.e. the operating mode 290, is reached. Data were thus not capable of being communicated (step 211) in the aforementioned case with modified DES key. It is likewise assumed that neither a test request (step 212) nor a register solicit (step 214) was initiated in order to check the remaining credit. However, the franking mode 400 is then reached.

In another version, the keys (cryptokeys) relevant for the communication for the data required for a reloading of credit (these cryptokeys having been entered encoded in the memory), are likewise completely erased when an unauthorized operation on the postage meter machine ensues. As already set forth in conjunction with FIG. 7, the authority to open the postage meter machine can be obtained after a request to open, causing a new code causing a new code word Y to be loaded. FIG. 7 shows a corresponding glow chart for introducing the code word Y according to the solution of the invention.

A further possibility for realizing the kill mode is to partially erase the postal register readings which are redundantly stored. The redundancy is thus intentionally reduced in a predetermined way. This reduction of the redundancy should differ from other data errors that can be independently eliminated by the postage meter machine, as set forth in greater detail in pending European Application 93 103 951.5. This discloses a method for memory correction of security-related data in a postage meter machine, whereby redundantly stored data are compared to one another in order to reload a memory area having faulty data with error-free data. This, however, is no longer possible given a sixth type of error because all redundantly stored data now have different errors that can no longer be automatically corrected. Only a service technician could reconstruct the data in a predetermined way; this must then occur after every authorized opening before the postage meter machine resumes operation.

The hardware of postage meter machines is also accessible in a known way via a closable flap that must be opened via a security key. In order for tampering to occur, the seal must be previously broken, or the seal number must be overcome, this being likewise present outside the postage meter machine stored in the central data station. The central data station supplies a feedback information to the post office, or to the inspector who visually checks the seal on-site and compares it to the displayed, internally stored seal number.

In an authorized opening, the existence of unbreached security assumes the reliability of the authorized person (service technician, inspector) and the possibility of checking the presence (identity) of this person. The checking of the seal and the checking of the register readings during an inspection of the postage meter machine and, independently thereof, checking the data in the central data station supplies the monitoring reliability against an unauthorized opening. Checking the flanked postal matter using a security impression provides an additional supervisory reliability.

The postage meter machine implements the register check regularly and/or when switched on and can thus recognize the absent information in case the machine was opened in unauthorized fashion. The postage meter machine is then blocked. A manipulator could easily overcome the blocking in the absence of the above-described method requiring a new code word Y. Given an unauthorized opening, the existing code word, however, is thus lost and it would cost the manipulator too much time and effort to identify the valid code word by trial and error. In the mean time, the postage meter machine wold long since have been registered as being suspect in the central data station.

The potential manipulator of a postage meter machine must overcome a number of thresholds, this of course, requiring a certain amount of time. The postage meter machine already becomes suspect when no call establishment from the postage meter machine to the central data station ensues at certain time intervals. It is assumed that the person committing a manipulation at the postage meter machine will not report to the central data station.

A potential tamperer, who cannot gain access to the stored data for the aforementioned reasons, is additionally hindered, in accordance with the invention, from performing a manipulation of the print control signal to the printing head. A tamperer could attempt to feed manipulated, variable pixel image data into the print control signal given column-by-column printing. The postage meter machine is usually operated at high printing speed through maximum printing speed. A modified time sequence that could only be comparably simulated at a lower printing speed occurs given a manipulation of the print control signal for the printer head.

The print head is arranged in the postage meter machine so that it cannot be used without operation of the conveyor means in order to produce a franking impression which would not be accounted for. Such an arrangement is disclosed, for example, in U.S. Pat. No. 4,705,417, however, other arrangements having print head based on a different operating principle are also conceivable, which cannot be used without a conveyor means.

Since the printer head cannot be used without a conveyor means in order to produce a franking that has not been accounted for, the conveying speed or the printing speed is monitored. When a thermotransfer printer is utilized, it is adequate to evaluate the ribbon speed of the inking ribbon which is already measured via an encoder. The encoder pulses are counted within a time window that is supplied by the clock/date module 8 or is derived from the system clock of the controller means 6. The system clock is generated with a crystal-controlled clock generator that is not separately shown in FIGS. 1A and 1B. When the number of encoder pulses deviates from a specified number thereof, the motor 12 is correspondingly adjusted. When the specified/actual deviation has risen beyond an allowable extent, a fault signal is generated. This fault is logged and may potentially lead to the deactivation of the postage meter machine.

A check can then be carried out in step 202 of the flow chart shown in FIG. 2A to determine whether the printing speed is being observed or whether the printing speed deviates from the allowable value. When this criterion is met, an appropriate warning ensues in the display and this ultimately leads to the blocking of the postage meter machine if it is not heeded.

Another version checks the time sequence in the column-by-column printing by comparing the chronological duration for priming the individual columns wherein variable data occur. In particular, the number of clock pulses of the crystal-controlled clock generator between the individual encoder pulses can be counted. A check can then be made in one step 207 to determine whether the chronological sequence is observed or whether it deviates from the allowable chronological sequence. When the criterion is met, blocking of the postage meter machine ensues in a further step 208. The priming speed is barely reduced by the required system routine or by the chronological duration for safeguarding the postage meter machine in the operating mode.

By exploiting all time reserves during printing with the microprocessor of the control means that implements the column-by-column embedding of window data, there is hardly room or (time) for a manipulation. The method of the invention, however, is not limited to such fast postage meter machines. What is critical is the monitoring of the printing speed for deviations in the chronological sequence potentially produced by manipulations in order also to prevent a manipulation of the print control signal in addition to the security measures already undertaken.

The control unit 6 may be formed by a microprocessor or an OTP. In addition to a microprocessor, non-volatile memories and further circuits can be accommodated in the OTP in a common housing. The internal, non-volatile memory, for example, contains program memories and other data memories, and may permit security bits to be set which prevent read-out of the internal, non-volatile memory from outside of the OTP. These security bits can be set in the OTP during the manufacture of the postage meter machine. The use of security routines such as, for example, accounting routines with an emulator/debugger, can be used to identify routines which are being run with a duration which deviates from a predetermined duration. A clock generator/counter circuit can be used to prescribed the predetermined time intervals (i.e., a number of clock cycles) for the time-out generation or for printer control. When a specified time has elapsed and the anticipated result has not occurred, the clock generator/counter circuit generates an interrupt signal which reports the absence of the time span without the anticipated result to the microprocessor, whereupon the microprocessor initiates further measures. The clock generator/counter circuit can be set for monitoring the program running time. This is based on the requirement of a known number of clock cycles for a "normal" program run, or a "normal" run of a predetermined sub-routine. Before staffing the program or the sub-routine, the counter of the dock generator/counter circuit is preset, or is reset, in a predetermined manner. After the start of the program or the sub-routine, the counter reading is continuously incremented corresponding to the clock pulses from the clock generator. After the program or predetermined sub-routine has been completed, the reading of the counter is interrogated by the microprocessor, and is compared to the expected value.

A flag, which is interrogated in step 207, is set in a memory if a deviation of the running time of the program or predetermined sub-routine occurs. If this interrogation criterion is present, a branch is made to step 208. The postage meter machine can thus no longer be operated for franking (kill mode 1).

In an further embodiment for time supervision, the code word Y in the SRAM 24 is erased via the control line C. This can ensue in combination with the address line A and the data line D by overwriting with a predetermined, different word, for example 0000. This has the advantage that the detector 20 will still react to a manipulation which, of course, must have been preceded by an unauthorized opening, even if the sensor 21 was ineffective for whatever reasons.

In general, security in a postage meter machine which is capable of communication with a remote central data station is improved in accordance with the inventive method. As noted above, the postage meter machine contains a control unit 6, such as a microprocessor, which controls the execution of a start and initialization routine followed by a system routine, the system routine including a franking mode. Security is improved in accordance with the invention by internally distinguishing, within the postage meter machine, between non-manipulated and manipulated operation of the postage meter machine by supervising a chronological duration of the execution of programs or program sub-routines in the postage meter machine by comparing a measured running time of a program of sub-routine to a predetermined running time. Measures are then initiated to ensure the security of the postage meter machine if the measured running time is not equal to the predetermined running time. These measures include placing said postage meter machine in first mode wherein franking is prevented, requiring establishment of a first security criterion to exit said first mode, placing said postage meter machine in a second mode if said first security criterion is not satisfied and requiring a second security criterion to exit said second mode.

Again in general, instead of monitoring the running time as the criterion for initiating security-ensuring steps, a count value can be varied during execution of a program routine in the postage meter machine and the count value can be compared to a predetermined count value after the execution of the program routine. If the count value is not equal to the predetermined count value, steps can be then be initiated to ensure the security of the postage meter machine, including inhibiting the postage meter machine from conducting a franking and.

Other versions, or combinations with other versions, are possible such as, for example, erasing a part of the information generated by the DES key or erasing redundant register readings, or erasing other data or keyed information which are of significance for the central data station in a transaction. It is important that the critical portions of the program are stored in the OTP, and that the program running time supervision is performed by software and/or hardware contained in the OTP. The important programs which am stored externally of the OTP in the program memory 11 can thus be monitored by the security program stored in the OTP. This has the advantage that the supervision program itself cannot be observed or manipulated, since it is exclusively present in the OTP, and cannot be read-out from the OTP.

A higher security level is achieved when the aforementioned time supervision monitoring is undertaken in combination with the use of the sensor 21. In a "streamlined" version of the machine, however, the sensor 21 can be eliminated because the housing will be adequately secured in a different manner, and the monitoring function is assumed by the detector 20 in the above-recited manner.

In a version that is not shown in FIG. 1B, the detector unit 20 can be a component of the processor (OTP). In this case the detector unit 20 is preferably a non-volatile memory that cannot be externally read out. For example, a 256 byte $E^2$ PROM such as TMS 370 C010 of Texas Instruments, is a suitable processor type. When a manipulator performs an unauthorized operation, the postage meter machine is effectively shut down by being switched into the first mode.

During an inspection, the seal of the postage meter machine is first checked for integrity and the register readings are then checked. As needed, a sample impression having the value zero can be made. In the case of a repair by service on site, an operation may possibly have to be performed on the postage meter machine. The error registers can be read out, for example, with the assistance of a special service EPROM that is plugged into the board instead of the usual EPROM. When this service EPROM is in location and is not accessed by the processor, access to the data lines is usually prevented by specific delivered circuits that are not shown in FIGS. 1A and 1B. The data lines, which can be reached through a sealed housing door, can thus not be contacted without authorization. Another version is to read-out data identified as erroneous by a service computer connected via an interface. The registers of the postage meter machine are interrogated in preparation for the operation in order to identify the type of required operation. A separate cell to the data central ensues before an operation is performed on the postage meter machine and before the housing is opened. When the prescribed value is modified to zero thereafter within a predetermined time span and is communicated to the data central within the framework of a transaction, i.e. the type of operation and the register data have been communicated to the data central, a communication of data from the data central to the postage mater machine ensues corresponding to a requested, authorized operation performed on the postage meter machine, this being logged as an allowed operation intervention.

If, however, the prescribed value is modified to a value differing from zero within a predetermined time span and is communicated to the data central within the framework of a transaction, a separate call to the data central that ensued previously is not responded to, i.e. a request to open is not considered to have been made and permission for an authorized operation (opening authorization) performed on the postage meter machine is not granted and, consequently, a new code word Y' is not communicated.

In general, security is improved in a postage meter machine containing a control unit 6 by a method wherein data are communicated from a data central to the postage meter machine corresponding to a requested, authorized operation performed on the postage meter machine and the operation is logged as an allowed operation in the control unit 6. The control unit 6 distinguishes among requested, authorized and unauthorized operations performed on the postage meter machine using the data communicated from the data central, and an operation is logged as an error in the case of an unauthorized operation performed on the postage meter machine. After the conclusion of an authorized operation performed on the postage meter machine, the postage meter machine is restored to its original operating condition using the data communicated from the data central. The postage meter machine is switched into a first mode, thereby disabling the postage meter machine, if the correct data are absent because an unauthorized operation was performed on the postage meter machine.

The postage meter machine can be operated using a program having a number of program parts, each program part having a specified time for execution thereof. In the method described immediately above, an unauthorized operation can be distinguished from an authorized operation by monitoring the time for executing a selected program part, setting a flag in a memory in the postage meter machine if the execution time is exceeded, repeatedly interrogating the memory to determine whether the flag is present therein and, given the presence of the flag in the memory, executing the step which switches the postage meter machine into the first mode, which disables the postage meter machine.

As an additional security procedure, a code word can be stored in a memory of the postage meter machine, the continued presence of the code word in the memory being required in order to prevent the postage meter machine from automatically transferring into the first mode when the postage meter machine is opened. The code word is erased in the memory if the time for executing the selected program part is exceeded, and the code word is then overwritten in the memory with a predetermined different word. The memory is repeatedly interrogated for the presence of the code word, and the postage meter machine is switched to the first mode given the absence of the code word in the memory, thereby disabling the postage meter machine. As yet a further security measure, the postage meter machine can contain a number of stored security-related data in addition to the code word, and at least a portion of the security related data can be erased if the time for executing the selected program part is exceeded. The memory locations at which the additional security-related data are stored are interrogated to determine the complete presence of the security-related data, and the postage meter machine is switched to the first mode if an interrogation of the memory location indicates that any of the security-related data has been erased, thereby disabling the postage meter machine.

Instead of monitoring the time for executing a selected program part, a program part can be selected which requires a specified number of repetitions for execution thereof, and the number of repetitions of this selected program part can be monitored. A flag is set in a memory of the postage meter machine if the number of repetitions is exceeded, and this memory is repeatedly interrogated to determine the presence of the flag therein. Given the presence of the flag indicating that the number of repetitions of the selected program part has been exceeded, the step of switching the postage meter machine to the first mode is initiated. The embodiment wherein the number of repetitions for executing the program part is monitored instead of the execution time can also be used with the above-described further security measures of requiring the continued presence of a code word in the memory of the postage meter machine, and requiring the continued complete presence of additional security-related data in the postage meter machine.

Another alternative in a postage meter machine which has an openable housing is to provide a sensor which generates a signal upon the opening of the housing, this signal being supplied to the control unit 6. The presence of the signal in the control unit 6 is used in combination with the data communicated from the data central for distinguishing among requested, authorized and unauthorized operations performed on the postage meter machine.

The postage meter machine is capable of distinguishing between a requested authorized operation and an unauthorized operation performed on the postage meter machine on the basis of the control unit of the postage meter machine in combination with the data communicated from the data central, whereby, in the event of an unauthorized intervention into the postage meter machine, this intervention is logged as a fault but, after an authorized operation performed on the postage meter machine has ensued, the original operating condition is restored on the basis of the aforementioned, communicated data.

In general, a method for improving the security of a postage meter machine which is capable of communication with a remote data central station, the postage meter machine containing a control unit 6 such as a microprocessor, under the supervision of an OTP, for executing a start and initialization routine followed by a system routine, the system routine including a franking mode, includes the following steps. A checksum is formed in the OTP for a content of an external program memory. The checksum is compared to a predetermined value stored in the OTP at a specified point in the operation of the postage meter machine. The postage meter machine is inhibited if the predetermined value and the checksum do not coincide. The predetermined time can be before execution of the flanking mode, after execution of the franking mode, or during the start and initialization routine, Alternatively, the postage meter machine may have a standby mode wherein frankings are not conducted, and the predetermined time can be during the standby mode. In a machine having a standby mode, the method can include the additional steps of forming a checksum of accounting register readings during the standby mode, and comparing the checksum of the accounting register readings to a further predetermined value and inhibiting the postage meter machine if the checksum of the accounting register readings is not equal to the further predetermined value.

The aforementioned basic method can include the additional steps, in the flanking mode, of initiating a print output request each time a flanking image is to be printed and, after printing, repeating a program loop to determine if a further print output request exists and, if so, repeating the program loop including a printing. The control unit 6 monitors whether a printout request is absent for a predetermined time, and if the predetermined time is exceeded without a print output request, a flag is set and a return is made to the beginning of the system routine. The postage meter machine is interrogated for the presence of this flag and, if the flag is present, the postage meter machine is placed in a standby mode. In the standby mode, a checksum is formed of the content of the program memory and a checksum comparison is made. If the checksum comparison is acceptable, the flag is reset, and if the checksum comparison is unfavorable, the postage meter machine is inhibited.

Additionally, the continued presence of a valid code word, stored in the postage meter machine, can be required in order for the postage meter machine to operate, and then the step of inhibiting the postage meter machine further includes erasing the valid code word.

When the machine is in a standby mode, wherein a printing is not to be undertaken, an interrogation with respect to attempts to manipulate the machine can still be undertaken and/or the checksum of the register readings and/or the content of the program memory 11 can be formed. In order to improve security against manipulation, the checksum regarding the content of the external program memory 11 is formed in the OTP in a kill mode 2, and the result is compared to a predetermined value stored in the OTP. This preferably ensues in step 101, when the postage meter machine is started, or in step 213 when the postage meter machine is operated in the stand-by mode. The stand-by mode is reached when no input, or no print request, occurs for a predetermined time. The absence of a print request, for example, may occur, for example, when a letter sensor of the type known in the art does not identify a next envelope which is to be franked. Step 405 (FIG. 4B) in the franking mode 400 therefore also includes a further interrogation regarding the number of executions of the program loop, which ultimately leads back to the input routine according to step 401. When the interrogation criterion is satisfied, a standby-flag is set in step 408 and a return is made directly back to the point s in the system routine 200, without passing through the accounting and printing routine in step 406. The standby-flag is interrogated in step 211 and is reset in step 213 after the checksum comparison when an attempted manipulation is not detected.

The interrogation criterion in step 211 can be expanded by determined whether the standby-flag has been set, i.e., whether the stand-by mode has been reached. In this case, a branch is made to step 213. In preferred version, the code word Y is erased in the manner described above if a manipulation attempt in the stand-by mode has been identified in the aforementioned manner in step 213. The absence of the code word Y is recognized in step 207, and a branch is made to step 208. The advantage of this procedure in combination with the first mode is that the manipulation attempt is statistically acquired in step 213.

In order to further enhance security against manipulations, a flow control can be utilized. Such a flow control ensues by varying a count value in a memory at at least one point during the execution of the program routine. After the execution of the program routine, the modified count value is compared to a predetermined numerical value allocated to this program routine. When branches are executed during the program execution, different count values arise. A plausibility test is then made in a subsequent evaluation, or a determination can be made as to which branches were executed. This is possible by making the variation of the count value be in the form of a multiplication by a specific prime number allocated to a respective program routine or branch. The subsequent evaluation can thus be accomplished simply by making a prime number resolution of the count.

In a further version, which only those program parts routines without branchings into consideration, or wherein no tracking of the program branches which have been executed is required, it is adequate simply to increment the count value upon each branching.

The explanation of the sequences in the franking mode shown in FIGS. 4A and 4B ensues in combination with the block circuit diagram shown in FIG. 1A.

The invention assumes that the postage value in the value impression is automatically prescribed according to the last input before the shut-off of the postage meter machine and that the date in the postmark is automatically prescribed according to the current date after turn-on, and that the variable data are electronically embedded into the fixed data for the frame and for all associated data that have remained unmodified for the impression. These variable data of the window contents shall be referred to below as window data and all fixed data for the postage, the postmark and the advertising slogan shall be referred to below as frame data. The frame data can be taken from a first memory area of a read-only memory (ROM) that simultaneously serves as the program memory 11. The window data are taken from a second memory area and correspond to the contents of memory areas $B_j$ of the non-volatile main memory. They can be read from those areas at any time for the purpose of a combination to form an overall presentation of a franking format. It is thereby provided to transfer the hexadecimal window data into the respective separate memory areas $B_1$ through $B_4$ of the non-volatile main memory 5 in transit-time-encoded form and to store the data therein. Moreover, the time in the clock/date module continues to run even when the postage meter machine is shut off. When, thus, the step 401 in the flanking mode 400 is reached, data already stored can be accessed after the postage meter machine is switched on even without an input. This setting is particularly directed to the last setting of the postage meter machine with respect to the value of the postage, which is displayed in step 402 before the editing of the priming data ensues in step 403. The current variable pixel image data (date and postage value) are thereby embedded into the fixed frame pixel image data. An interrogation of the input means for possible, further inputs subsequently ensues in step 404.

Inventively, the data from both memory areas are combined to form a pixel print image before the printing and according to a predetermined allocation. The variable information in the window provided for the data can be subsequently supplemented and modified. In order to save time, only those parts of a graphic presentation that are in fact modified are newly entered in the non-volatile main memory, given a modification. A first memory area A is present in the program memory 11 (among other things, for the data of the constant parts of the franking format, including the advertising slogan frame). The sub-memory areas $A_i$ are provided (i=1 through m) for frame or fixed data, whereby the index i identifies the respective frame that is preferably allocated to a specific cost center.

All alphanumerical characters, or symbols, are deposited pixel-by-pixel in the character memory 9 as binary data. Data for alphanumerical characters or symbols are stored compressed in the form of a hexadecimal number in the non-volatile main memory 5. As soon as the number of the cost center, entered into the memory area C, is present in stored form, the compressed data from the program memory 11 are converted with the assistance of the character memory 9 into a print format comprising binary pixel data which is stored in the volatile main memory module 7 in such a decompressed form (step 403). Main memories 7a and 7b and pixel memory 7c shall be referred to below for explaining the invention, even though preferably only a single memory module is employed.

The memory areas in the non-volatile main memory 5 can contain a plurality of sub-memory areas in which the respective data are stored in data sets. The sub-memory areas $B_j$ are provided for j=1 though n window data, whereby various allocations between the sub-memory area of the various memory areas are stored in a predetermined fashion.

Control code and run-length-coded frame or window data are contained successively in alternation in every data set of a sub-memory area $A_i$, $B_j$. Before printing, the respective, selected, fixed data are transferred from the non-volatile program memory (PSP) 11 into of a volatile main memory 7a in step 403, whereby the control code is decoded and is stored in a separate memory area of the main memory 7b during the transfer. The respective, selected window data for the postmark and the postage impression are likewise loaded into registers. The registers are preferably formed by sub-memory areas in the memory area of the main memory 7a. In another version, these aforementioned registers are parts of the microprocessor control 6. By decompression, the transit-time-coded, hexadecimal data are converted into corresponding, binary pixel data.

Once called in, the constant parts of the franking format are constantly available in decoded form in the pixel memory area I in the volatile pixel memory 7c. For a fast modification of the window data, there is a second memory area B in the non-volatile main memory 5.

The number chains (strings), that are entered with a keyboard 2 for producing the input data or are entered via an electronic scale 22 that is connected to the input/output means 4 and calculates the postage value, are automatically stored in the memory area D of the non-volatile main memory 5. Data sets of the sub-memory areas, for example $B_j$, C, etc., also remain preserved. It is thus assured that the last-entered input quantities are also preserved when the postage meter machine is shut off, so that the postage value in the value impression is automatically prescribed according to the last input before the shut-off of the postage meter machine after turn-on and the date in the date impression is automatically prescribed according to the current date. When a scale 22 is connected, the postage value is taken from the memory area D. A wait takes place in step 404 until such a postage value is currently available in stored form.

Given another input request, a return to step 401 is again undertaken. Otherwise, a branch is made to step 405 in order to wait for the print output request. The letter to be flanked is detected by a letter sensor and a print request is thus triggered.

A branch can thus be made to the accounting and printing routine in step 406. When no print output request (step 405) is present, a return is made to step 401 (point d) or—according to a version shown in FIG. 4B—to step 301 (point e) via a step 407 to increment the loop run counter.

When, according to the other version shown in FIG. 4B, a return is made not to point d but instead to point e and step 301 is reached, a communication request can be made at any time or another entry according to the steps of test requests 212, register check 214, or input routine 401 can be activated. Further steps 401–404 are executed as in the version according to FIG. 4A. A further interrogation criterion can be interrogated in the following step 405 in order to set a standby flag in step 408 when a print output request is not present after a predetermined time or a predetermined number (G) of executions of the loop. As set forth above, the standby flag can be interrogated in the step 211 following the communication mode 300. A branch is thus not made to the flanking mode 400 until the checksum review has yielded the full complement of all programs, or of at least selected programs.

When a print output request has been recognized in step 405, further interrogations in the following, optional steps 409 and 410 as well as in step 408 are activated. For example, the presence of a kill mode flag set in step 208 (FIG. 2B) is interrogated in step 408; reaching a further piece number criterion is interrogated in step 410; and/or the register data fetched for accounting in a known way are interrogated in step 406. When the piece number intended for franking was used in the preceding flanking, i.e. the piece number is equal to zero, a branch is automatically made to point e in order to enter into the communication mode 300 so that a new, predetermined piece number S is again credited by the data central. If, however, the predetermined piece number has not yet been used, a branch is made from step 410 to the accounting and printing routine in step 406.

The number of printed letters and the current values in the postal registers are registered according to the input cost center in the non-volatile memory 10 of the postage meter machine in an accounting routine 406 and are available for later interpretation. A specific sleeping mode counter is initiated to increment one bit during the accounting routine that ensues immediately before printing. The register values can be interrogated as needed in the display mode. The register values are likewise printed out with the printer head of the postage meter machine for accounting purposes. For example, this can likewise ensue in the way already set forth in greater detail in German Application P 42 24 955.4.

In another version, variable pixel image data are also embedded in the other pixel image data during printing. Corresponding to the position report supplied by the encoder 13 regarding the feed of the postal matter or of the paper tape in relationship to the printer module 1, the compressed data are read from the main memory 5 and are converted with the assistance of the character memory 9 into a print format comprising binary pixel data which is likewise stored in this decompressed form in the volatile main memory 7. Further details may be derived from European Published Applications 576 113 and 578 042.

The pixel memory area in the pixel memory 7c is thus provided for the selected, decompressed data of the fixed parts of the franking format and for the selected, decompressed data of the variable parts of the franking format. The actual printing routine ensues (in step 406) after the accounting.

As proceeds from FIGS. 1A and 1B, the main memory 7b and the pixel memory 7c are in communication with the printer module 1 via a printer control 14, which includes a print register 15 and output logic. The pixel memory 7c has an output side connected to a first input of the printer control 14, which has further control inputs to which output signals of the microprocessor control means 6 are supplied.

When all columns of a print format have been printed, a return is made to the system routine 200. The flow chart shown in FIG. 2A for a security system includes steps 201–206 for monitoring further criteria. Given an infringement of one of the security criteria, the postage meter machine enters into a sleeping mode, for example when a connection to the central data station has not yet been established after using a predetermined number of items. A detail of the flow chart for a first sleeping mode version shall be set forth with reference to FIG. 5. Proceeding from the system routine 200, the postage meter machine enters into a step 201 in which current data S and $S_{ref}$ are called in. The postage meter machine contains a permanently stored comparative value $S_{ref}$ for a number of franked items. In agreement with the amount of the credit just reloaded during a communication, among other things, a permitted number of items S to be franked is set, this being decremented subsequently at every franking. This is continued until the comparative value $S_{ref}$ of number of items has been reached. When this is determined in step 202, a warning, for example "TELESET" ensues in step 203 in order to prompt the user of the postage meter machine to communicate with the central data station. Due to this display, a delay $t_n$ occurs in the operating sequence of the postage meter machine. In the following step 204, the delay is incremented with the chronological duration $t_k$ for a next display but the comparative value for number of items is decremented by the value n before a branch is made to step 207. It is thus assured that the request to communicate with the central data station becomes more and more urgent because the postage meter machine dwells in step 203 for a longer and longer time. If, however, a communication 300 was completed, data were communicated (step 211) and were stored in the area G of the non-volatile memory 5 of the postage meter machine during the statistical and error evaluation mode.

The postage meter machine and the central data station respectively agree upon a predetermined number S of items, i.e. the amount that can be flanked until communication is again established. If a communication does not occur (monitoring the number of items), the postage meter machine slows in function (sleeping mode version 1). The reset quantities $t_n$ or the values S and $S_{ref}$ are thus called in as current data in step 201. When a calculation is made in the central data station regarding the number of items that are to franked until the next establishment of communication is required stored, historic data about the credit reloading behavior or franking behavior (number of items of postal matter having average postage) must be consulted. The communication of a new number S' of items can ensue in the same way as was already set forth in conjunction with the communication of the new code word Y'. Given a communication according to FIGS. 3A and 3B, a new, predetermined number S' of items is communicated and is decremented by the number S of items with ongoing franking. The comparative number $S_{ref}$ of items is internally calculated from the new, predetermined number S' of items (step 213).

Figure 6:
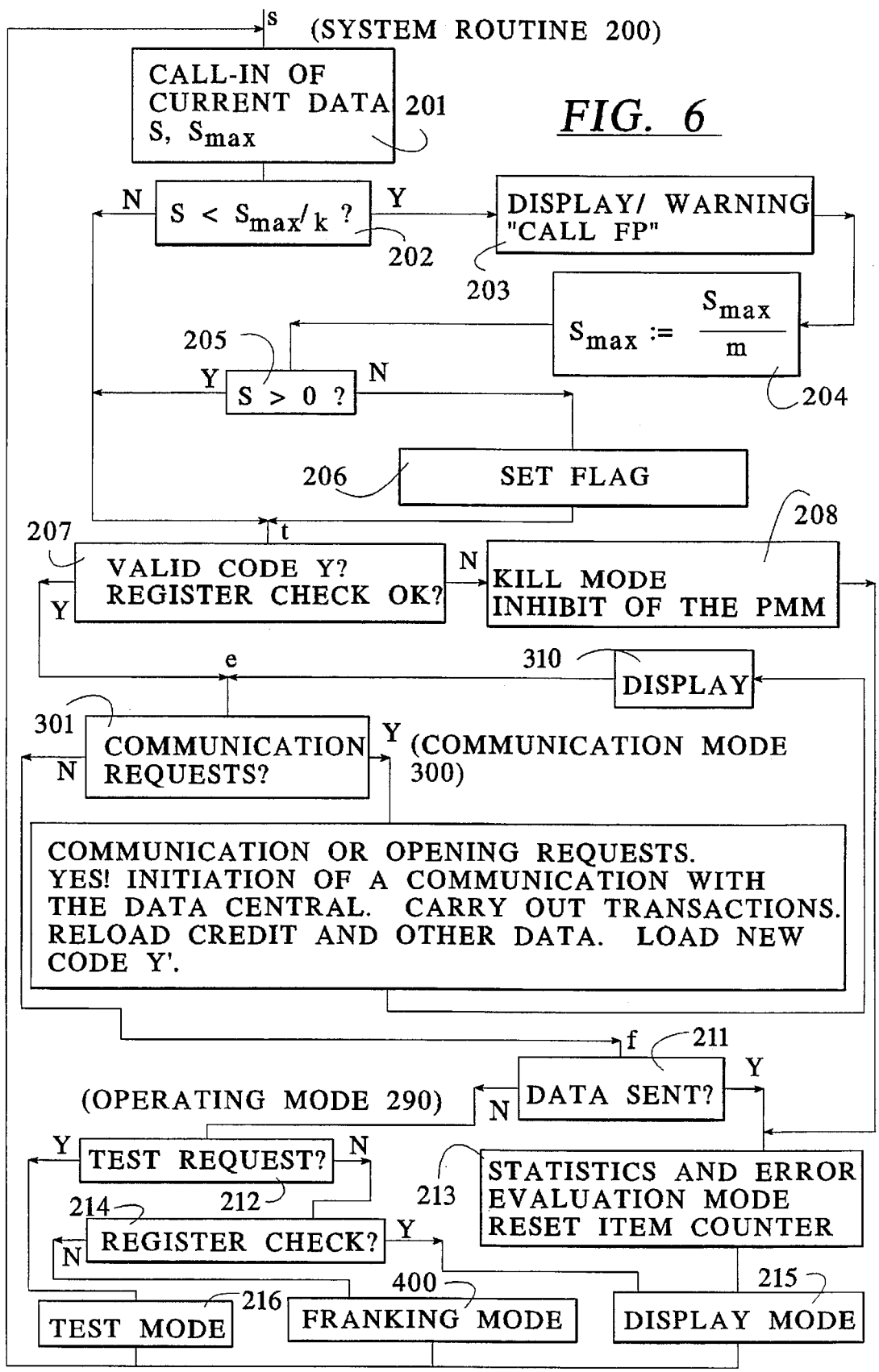
FIG. 6 is a flow chart of a second embodiment of the sleeping mode.

FIG. 6 shows the modified flow chart of a second sleeping mode version. Steps 100–105 as well as 210 have not been shown. After the call-in of the communicated, current data in step 201, the number S of items to be decremented is compared to a comparative number of items in the step. The comparative number of items is calculated from the division of a maximum number $S_{max}$ of items by a number k. When the criterion is met, a branch is again made to a step 203 which briefly displays the warning, for example "CALL FP". Subsequently, the new maximum number $S_{max}$ of items is formed in step 204 via a division by a further number m which would be required for the next comparison in step 202 if no communication with the central data station or no reloading of credit ensues. Even though conditions for generating an alarm am present, therefore, the display of an alarm can be delayed until the next item count limit. It is possible, however, to generate an alarm after increasingly shorter intervals, i.e., following a predetermined number of frankings, and thus bringing increasingly urgent attention to the requirement to make a communication with the central data station. The franking, however, is not negatively influenced. As long as the check in step 205 shows that the number S of items is still greater than zero, step 207 is reached. The warning merely appears more and more often in the display. Otherwise, a branch is made to step 206, whereby, for example, a flag is set that is interrogated later in step 301 and is interpreted as a communication request. An additional display to the effect that the communication now ensues automatically and the franking function is asleep until the communication has been successfully concluded can likewise ensue in step 206. Of course, the user of the postage meter machine can call in the communication mode at any time.

In another version, step 204 is omitted. A continuous alarm is generated identifying an impending sleeping mode of the franking machine in step 203. Step 203 must be constantly executed due to a satisfied interrogation criterion in step 202, before step 205 is reached.

Step 203 also includes a sub-step for error statistics, corresponding to the statistical error evaluation mode 213.

The postage meter machine requests a connection to the data central in the way disclosed by U.S. Pat. No. 3,255,439. When the connection is set up, the data central checks the register readings. If the reloading cannot be undertaken, the data central inhibits further operation of the postage meter machine with a signal communicated to the postage meter machine. When the connection was set up shortly after the signaling undertaken by the postage meter machine and the register readings are not found deficient, the postage meter machine can be switched back into the operating mode without a further, unscheduled inspection. To this end, new, current data are communicated, for example for a credit and for the allowed piece number that can be franked up to the next call setup.

The data central can distinguish between automatically undertaken communication and normal communication on the basis of the communicated signalization code. The former will always ensue when the user of the postage meter machine has overlooked or ignored the requests to communicate and does not perform appropriate input actions. An unscheduled inspection can thereby be arranged in the case of repeated instances of this type, which cause the existence of a manipulation to be suspected.

The current data called in in step 201 immediately after a communication may comprise a calculated or communicated, specific piece number S' as the piece number S and a maximum piece number $S_{max}$. The comparison piece number $S_{ref}$ for a first piece number criterion corresponds to the calculated or communicated, maximum piece number $S_{max}$ divided by the number k. When the first piece number criterion for the second mode interrogated in step 202 is satisfied, a branch is made to the following step 203 in which a constant alarm is generated indicating a pending sleeping of the postage meter machine function, or a request for renewed communication with the data central before step 205 is reached for checking the data on the basis of a further piece number criterion. Given non-satisfaction of the further piece number criterion, step 206 is implemented for automatic communication requests of the postage meter machine. During a communication with the data central, transaction data are individually and serially transmitted that comprise at least one decision criterion protected by a MAC, whereby the automatic communication attempt is canceled if the transaction has been successfully executed. A determination was previously made in step 306 of the communication mode 300 shown in FIG. 3A that no further transaction is required and a return after display (step 301 ) is made to point e. When a further transaction request is then not manually entered, a branch is made from step 301 to the operating mode (point f). Manually and automatically lodged transaction requests can thus be distinguished from one another in step 301.

When the communication has not yet arisen or, for example, the data central has not been obtained after a predetermined time, i.e. no line is free, this is interpreted as a communication error in step 305. A return is then made to step 304 and dialing is repeated up to a predetermined number of attempts. When this predetermined number has been reached, a return to point e is again made from step 305 via the display step 310. If n repeated dialings remained unsuccessful, a communication flag which may have been previously set can be reset in step 305, so that no transaction requests with respect thereto are then recognized in step 301. Additionally, a standby flag can be simultaneously set, this again being recognized in step 211. The content of the program memory (PSP) 11 is thus checked with reference to a checksum or other tests are implemented in the aforementioned way in step 213 for evaluation of statistics and errors. The standby flag is reset after these tests and a return is made to the system routine 200 point s.

When, according to FIG. 4B, work is carried out according to the other version for the franking mode 400, including step 410, then a standby flag need not be set. A return can be directly made from the franking mode to the communication mode 300 point e. Other inputs, for example according to the steps of test request 212 or register check 214 can thus also be activated. Only when a branch is made to the franking mode 400 is a new determination made in step 410 corresponding to the decision criterion as to whether an automatic communication is required. This is preferably the case when the predetermined piece number has been used.

When the communication was successful and data were communicated (interrogated in step 211), step 213 is likewise reached. The current data that are called in in step 201 and are subsequently needed again in the comparison in step 202 are calculated or loaded in step 213. The decision criterion that is communicated is preferably the new piece number S'.

In an alternative version, the new number S' of items is internally calculated in the postage meter machine in the evaluation mode 213. In this case, the communication with the central data station no longer covers the new number S' of items but is merely required for triggering the calculation in the evaluation mode 213. The calculation ensues internally in the postage meter machine and in the central data station in parallel therewith according to the same methods on the basis of the communicated register data. Funding and franking data for the postage meter machine can be transmitted from the postage meter machine to the central data station, and the specific number of frankings, from the funding and franking data, can be calculated at the data central station in parallel with the calculation of the specific number at the postage meter machine.

The postage meter machine can communicate the following register values to the central data station before a reloading of credit:

R1 (descending register) amount remaining on hand in the postage meter machine;

R2 (ascending register) aggregate amount used in the postage meter machine;

R3 (total resetting) the previous, total prescribed sum of all remote value prescriptions;

R4 (piece count Σprinting with value≠0) plurality of valid impressions;

R8 (R4+piece count Σprinting with value=0) plurality of all impressions.

Following therefrom is:

$$R3 = R2 + R1. \tag{1}$$

R1 can be interrogated and statistically evaluated at every remote value prescription. When R1 becomes greater and greater, the same reloading amount can be reloaded in longer and longer reloading periods, or the number of items that can be flanked before the next communication is set lower.

The number of items can be calculated from the average number $S_0$ of items to which a disposition number $S_x$ of items is added, with $$S' = S_0 + S_x \tag{2}$$

and $$S_0 = R8_{old} \left[ \frac{R2_{new}}{R2_{old}} - 1 \right] \tag{3}$$

or $$S_0 = R4_{old} \left[ \frac{R2_{new}}{R2_{old}} - 1 \right] \tag{4}$$

The interrogated register values are provided with the index "old". A value $R2_{old}$ taken from the ascending register corresponds to the current interrogated value. The future value $R2_{new}$ is derived according to a prescribed value that must be added to the current interrogated value. The disposition number $S_x$ of items is dependent on the classification of the user of the postage meter machine as an A, B or C customer.

In a further version, the disposition number $S_x$ of items is calculated dependent on the classification $\alpha_x$ of a postage meter machine user as an A, B or C customer and is additionally calculated dependent on the franking behavior of this customer:

$$S_x = \alpha_x \cdot R8_{old} \cdot R1_{old}/R2_{old} \qquad (5)$$

or $$S_x = \alpha_x \cdot R4_{old} \cdot R1_{old}/R2_{old} \qquad (6)$$

In general, an ascending register is maintained in the postage meter machine having a register value which changes upon each franking by the postage meter machine. This ascending register is periodically interrogated to obtain the value $R2_{old}$ as an interrogated register value. The system routine causes the postage meter machine to conduct a printing impression in the franking mode, and a count $R8_{old}$ is maintained of all impressions made by the postage meter machine. In the postage meter machine, a number S' is calculated as an allotted number, by adding an average number $S_0$ of items to a disposition number $S_x$ of items. The value $S_0$ is calculated according to equation (3) above, and $S_x$ is then calculated according to equation (5) above. Alternatively, $S_0$ can be calculated according to equation (4) above, in which case $S_x$ is then calculated according to equation (6) above.

In another version of the inventive method employing a franking count, a first criterion is established indicative of whether the security of the postage meter machine has been breached, and if this first criterion is not satisfied, the postage meter machine is placed in a first mode which prevents the postage meter machine from conducting a franking, and a warning is displayed. Specific measures are then required to be undertaken before the postage meter machine is again capable of franking. If this first criterion then becomes satisfied, current data are called from the microprocessor (control unit 6) in order to conduct a franking, at which point a second security-related criterion is established. If this second security-related criterion is not satisfied after the current data are called, the postage meter machine is caused to enter into a second mode. In this second mode, a running count of the number of items franked by the postage meter machine is compared to a further franking number of criterion. If the further franking number of criterion is not satisfied, a communication from the postage meter machine to the central data station is automatically requested and a transaction is conducted between the postage meter machine and the central data station including transmission, from the postage meter machine to the central data station, of at least one decision criterion protected by a MAC. The automatic communication request is cancelled if the transaction is successfully completed.

Additionally, in the franking mode a repeated interrogation can be undertaken to determine whether the further franking number of criterion has been satisfied, and an automatic branch from the franking mode is made to a communication mode, for communicating between the postage meter machine and the central data station, if the further franking number of criterion is satisfied. The further franking number of criterion can be 0. Additionally, the control unit 6 can be made to distinguish as to whether the transaction was requested manually or automatically.

The behavior of the postage machine user is monitored by the central data station on the basis of data communicated during the communication in order to identify suspect postage meter machines. A corresponding "suspicious mode" can only be activated by the central data station, whereby no direct consequences on the postage meter machine occur.

A postage meter machine profile can be produced on the basis of the data specifically associated to a postage meter machine. This postage meter machine profile provides information as to whether a customer was in the position with the reloading events that were completed to carry out the calculated plurality of flankings. Two stages are to be distinguished within the "suspicious mode":

1. Postage meter machine is suspicious, and
2. Postage meter machine must have been manipulated.

Various data specifically associated with a particular postage meter machine can enter in to the calculation for identifying the postage meter machine profile. The following equations are available for selection:

$$V_{susp} = \frac{R4}{(R3-R1)} \cdot F_{min} = \frac{R4}{R2} \cdot F_{min} \qquad (7)$$

If $R1_{old} \neq R1_{new}$ then:

$$V_{susp} = \frac{R4_{new} - R4_{old}}{R1_{old} - R1_{old}} \cdot F_{min}.$$

$R1_{old}$=R1 after the $n^{th}$ value telesetting $R1_{new}$=R1 before the n+1 value telesetting $V_{susp}$=heuristic value that provides information about the condition of the postage meter machine, and $F_{min}$=minimum franking value.

Given in a minimum flanking value of, for example, $F_{min}$=20 cents, the following discrimination between cases derives:

$V_{susp}$<5 okay $V_{susp}$=5 ... 100 suspicious $V_{susp}$>100 manipulated

A plausibility check of all postage meter machines being utilized is implemented in the central data station at regular intervals. The machines whose flanking behavior seems suspicious or which have been manipulated are identified in this procedure and am reported to the postal authorities.

A further security measure (error overflow mode) is provided in the postage meter machine, as needed. This can be implemented as a further version of the sleeping mode in addition to or instead of the first or second version of the sleeping mode. When the interrogation criterion is satisfied in step 202, i.e., given an upward transgression of a predetermined number of errors, the reaction time span of the postage meter machine is slowed in step 203, this condition being simultaneously reported to the user of the postage meter machine via the display. One can then proceed in further steps similar to those described in conjunction with FIGS. 2A and 5. The postage meter machine stores internal errors, as well as operating errors and manipulation attempts, in an error register for protocol purposes, for example up to the number 999. When the condition of upward transgression of the number of errors is not eliminated (reset), for example, by maintenance service in an inspection, or by resetting during a communication with the central data station, the reaction time can be further increased in order to make possible manipulations more difficult. The number of errors is then monitored further, again up to a predetermined number such as 999, for example in step 213.

In general, all errors arising in the operation of the postage meter machine are logged, and entry into the second mode is made if a total of the logged errors exceeds an error overflow limit. This requires a communication with the data central, or inspection of the postage meter machine by authorized personnel, in order to reset the error log to remove the postage meter machine from the second mode. Additionally, in the second mode a time required by the postage meter machine to conduct a franking can be retarded. This retarding can be increased as the number of logged errors increases, such as by increasing the time required to conduct a franking by specified time amount (step) as each additional error is logged.

Another alternative is to identify an error as being an error arising due to an operator mistake, and actuating an electronic time lock of the postage meter machine which increases the time required to conduct a franking upon each error identified as an operator mistake.

In a first version, the reaction time, for example, the chronological duration to the beginning of the print operation, linearly increases with the number of errors. The execution of the program is not modified nor prevented, but is merely retarded. This can be accomplished, for example, by repeatedly calling in or executing uncritical program routines which are not monitored by time supervision (kill mode 1) such as, for example, the error display. The effect of the program is thus essentially unmodified.

In a second version, the reaction time is increased on a stepped basis, the steps being seconds, minutes, hours, days, etc. The aforementioned increase in the reaction time can occur upon every misoperation. To this end, in a further embodiment an electronic time clock is actuated and a progressive increase in the reaction time in the operating program is preferably provided in order to make a manipulation more difficult.

Step 213 can be partially or entirely executed as a sub-step in combination with other steps. For example, the statistical error mode is a constituent of the step 203 and of the accounting and printing routine according to step 206 in the franking mode 400, as shown in greater detail in FIG. 4A and 4B. If a serious accounting error occurs, the machine in inhibited in step 406 and or in step 208. If an error occurs, however, during the initialization phase in step 101, the machine simply halts operation and displays a specific error code.

FIG. 2B shows a second version of the flowchart of the solution of the invention. In step 207, not only is the structure check of the register data implemented, but also step 207 includes a check of the register contents. Given non-agreement with the interrogation criterion for a proper condition, a kill mode flag is set in step 208 for inhibiting the postage meter machine (PPM) and a branch is then made to point e. All requested inputs, communications with the data central, register displays or tests can thereby continue to be implemented even given an inhibited postage meter machine.

The kill mode flag is interrogated in the franking mode in step 409 preceding the actual accounting and printing routine (step 406), this interrogation taking place in the way shown in FIG. 4B. When the kill mode flag is set, the statistics and error evaluation mode (step 213) and the display mode (step 215) are run through and a return is then made to the system routine (point s).

The postage meter machine thus remains inhibited. Without being enabled, the postage meter machine again becomes operational when the error is eliminated, i.e., for example, when a letter jam has been eliminated or when a credit has been reloaded.

Even so, there are serious faults that can only be eliminated on the occasion of the next on site inspection by a person authorized to do so. Such an error, for example when the processor cannot access the main memory, i.e. it can neither read nor modify the data content of the RAM, is eliminated, for example, by plugging a special RESET-EPROM. To this end, the security seal must be broken. The RESET-EPROM contains the required data, for example the aforementioned Y-code, and specific programs for restoring the postage meter machine function. For example, such a program can in turn cancel a redundancy diminution that has been carried out. The logging of the errors that ensues separated according to types of error during the operation of the postage meter machine in the statistics and error evaluation mode (step 213), is thereby checked by the authorized person to see whether an attempted manipulation has been undertaken.

In general, a method for improving the security of a postage meter machine containing a control unit includes the steps of franking postal items in said postage meter machine using a printing head, said items being conveyed beneath said printing head at a conveying speed and said flanking taking place at a printing speed, executing programs in said postage meter machine for franking items, said programs having an execution time associated therewith and having a count value associated therewith which is varied during execution of a program, selecting at least one of said conveying speed, said printing speed, said program execution time or said count value as a first security indicator and comparing said first security indicator to a first security criterion, placing said postage meter machine in a first mode if said first security indicator does not satisfy said first security criterion and preventing further franking by said postage meter machine in said first mode and requiring establishment of said first security criterion to exit said first mode.

One such error evaluation procedure is shown in FIG. 8, which can be undertaken in step 213, or at any other suitable point in the program execution. In this exemplary procedure, a value in a memory is assigned to each branch point in the program routine (step 213a), and these stored values are varied each time the respective branch point is traversed in the execution of the program routine (step 213b). Each varied, stored value is multiplied by a prime number which is uniquely allocated to the branch to which the value is assigned (step 213c). For all branches, the product of the prime number multiplied by the varied, stored value is compared to a predetermined account value (step 213d). For any such product which exceeds the predetermined account value, a prime number resolution is then conducted so as to identify the branch which exceeded the predetermined account value (step 213e).

Although the invention has been described herein in the context of a thermal printer, it will be understood that the methods and circuitry and control techniques disclose herein are applicable to any type of digitally controlled dot matrix printer, including, for example, ink jet printers.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for improving the security of a postage meter machine which is capable of communication with a remote central data station, said postage meter machine being openable and containing a microprocessor which controls the execution of a system routine, said method comprising the steps of:

establishing a first communication link between a user and said central data station;

establishing a second communication link between said postage meter machine and said central data station and communicating data between said central data station and said postage meter machine which permits said postage meter machine to determine if a subsequent opening of said machine is authorized or unauthorized;

upon any opening of said housing of said postage meter machine, automatically causing said microprocessor to conduct a routine, employing said data communicated to said postage meter machine from said central data station, to determine whether said opening is authorized or unauthorized;

if said opening was authorized and said housing is closed, permitting said system routine to enter into said franking mode;

if said opening was unauthorized and said housing is closed, preventing said system routine from entering into said franking mode reporting an intent to conduct an authorized opening of said postage meter machine by making a request for opening at said central data station after establishment of said communication link;

communicating a new code word to said postage meter machine from said central data station upon approval of said request for opening, as part of said data communicated between said postage meter machine and said central data station; and automatically transferring said postage meter machine into a first mode for effectively shutting said postage meter machine off if said postage meter machine is opened and said new code word is absent from said postage meter machine.

2. A method as claimed in claim 1 wherein the step of automatically erasing said current code word upon any opening of said postage meter machine is further defined by the steps of:

storing said current code word in said microprocessor;

maintaining a closed sensor connection when said housing of said postage meter machine is closed;

arranging said sensor connection so that said sensor connection is interrupted upon any opening of said housing and thereby generating a signal indicating said housing has been opened; and supplying said signal to said microprocessor and erasing said current code word in said microprocessor upon receipt of said signal.

3. A method as claimed in claim 1 wherein said postage meter machine has a telephone number associated therewith, which can be changed, and wherein the step of communicating data between said postage meter machine and said central data station includes the step of transmitting data in unencoded form from said central data station to said postage meter machine to load a new telephone number into said postage meter machine.

4. A method as claimed in claim 1 wherein the step of communicating data between said central data station and said postage meter machine is further defined by serially communicating all data via said communication link protected by a message authentification code (MAC).

5. A method as claimed in claim 1 comprising the additional steps of:

storing a current code word in said postage meter machine, the presence of which is necessary to prevent said postage meter machine from automatically transferring into said first mode when said postage meter machine is opened;

automatically erasing said current code word upon any opening of said postage meter machine;

automatically substituting said new code word, if present in said postage meter machine, for the erased current code word upon opening of said postage meter machine;

preventing said postage meter machine from automatically transferring into said first mode if said new code word has been substituted for the erased current code word; and automatically transferring said postage meter machine into said first mode if said current code word is erased and no new code word is present to substitute for the erased current code word.

6. A method as claimed in claim 5 wherein the step of communicating said new code word to said postage meter machine from said central data station is further defined by communicating a new code word in encoded form to said postage meter machine from said central data station.

7. A method as claimed in claim 1 wherein the step of communicating data between said postage meter machine and said central data station includes communicating a credit reloading value, and wherein said credit reloading value is communicated in encoded form.

8. A method as claimed in claim 7 comprising the additional steps of:

transmitting a request in encoded form from said postage meter machine to said central data station to transmit a prescribed amount of a credit reloading value from said central data station to said postage meter machine.

9. A method for improving the security of a postage meter machine which is capable of communication with a remote central data station, said postage meter machine being openable and containing a microprocessor which controls the execution of a start and initialization routine followed by a system routine, said system routine including a franking mode, said method comprising the steps of:

storing a current code word in said postage meter machine;

establishing a communication link between said postage meter machine and said central data station;

reporting an intent to conduct an authorized opening of said postage meter machine by making a request for opening at said central data station after establishment of said communication link;

communicating a new code word to said postage meter machine from said central data station upon approval of said request for opening and storing said new code word in said postage meter machine at a different memory location from said current code word, said current code word and said new code word exclusively comprising valid code words;

automatically erasing said current code word upon any opening of said housing of said postage meter machine;

automatically substituting said new code word, if present in said postage meter machine, for the erased current code word upon opening of said postage meter machine;

automatically transferring said postage meter machine into a first mode for effectively shutting said postage meter machine off if said current code word is erased and no new code word is present to substitute for the erased current word and thus no valid code word is present in said postage meter machine;

preventing said postage meter machine from automatically transferring into said first mode if said new code word has been substituted for the erased current code word and thus a valid code word is present in said postage meter machine;

conducting said start and initialization routine followed by said system routine and conducting a periodic interrogation during said start and initialization routine and during said system routine to confirm the continued presence of new code word in said postage meter machine; and in said start and initialization routine, before conducting a first periodic interrogation, calling in current data to determine whether said postage meter machine satisfies a specified criterion to conduct a franking and, if said specified criterion is not satisfied, causing said postage meter machine to enter into a second mode which displays a notification of a need to communicate with said central data station and which prevents said postage meter machine from entering into said franking mode.

10. A method as claimed in claim 9 wherein the step of communicating said new code word to said postage meter machine from said central data station is further defined by communicating a new code word in encoded form to said postage meter machine from said central data station.

11. A method as claimed in claim 9 wherein said postage meter machine has a telephone number associated therewith, which can be changed, and comprising the additional step of transmitting data in unencoded form from said central data station to said postage meter machine via said communication link to load a new telephone number into said postage meter machine.

12. A method as claimed in claim 9 comprising the additional step of serially communicating all data via said communication link protected by a message authentification code (MAC).

13. A method as claimed in claim 9 comprising the additional steps of:

setting a specified number S' of frankings which can be conducted by said postage meter machine in said franking mode given an amount of funds which are present in said postage meter machine;

causing said system routine to enter into a sleeping mode, wherein a franking procedure is altered, when a number of frankings conducted by said postage meter machine in said franking mode approaches S; and calling in said number S as part of said current data which is called-in in said start and initialization routine.

14. A method as claimed in claim 9 comprising the additional steps of:

setting a flag which inhibits said postage meter machine if said postage meter machine enters into said second mode;

interrogating said flag upon any attempt by said postage meter machine to communicate via said communication link with said central data station; and resetting said flag if a successful communication between said postage meter machine and said central data station via said communication link ensues.

15. A method as claimed in claim 9 comprising the additional step of:

determining whether a valid code word is present in said postage meter machine by interrogating a predetermined memory location to obtain the contents of the predetermined memory location, storing a coded key having parts thereof stored in respectively different memory locations, and analyzing the contents of said predetermined memory location using a checksum analysis and said coded key.

16. A method as claimed in claim 9 wherein said system routine includes a routine branch into said franking mode, and wherein the step of automatically transferring said postage meter machine into said first mode for effectively shutting said postage meter machine off is further defined by inhibiting branching in said system routine into said franking mode.

17. A method as claimed in claim 9 comprising the additional steps of:

in response to said display of said notification, making a request for a credit reloading value from said postage meter machine to said central data station via said communication link; and transmitting a credit reloading value from said central data station to said postage meter machine via said communication link to re-fund said postage meter machine.

18. A method as claimed in claim 17 wherein the step of transmitting said credit reloading value is further defined by transmitting said credit reloading value in encoded form.

19. A method as claimed in claim 9 comprising the additional steps of:

in response said display of said notification, transmitting a request for a predetermined amount of a credit reloading value from said postage meter machine to said central data station via said communication link; and transmitting said predetermined amount of a credit reloading value from said central data station to said postage meter machine via said communication link to re-fund said postage meter machine.

20. A method as claimed in claim 19 wherein the step of transmitting said predetermined amount of a credit reloading value is further defined by transmitting said predetermined amount of a credit reloading value in encoded form.

21. A method as claimed in claim 9 comprising the additional steps of:

calculating in said postage meter machine a specific number of frankings which is permitted given a current amount of funds stored in said postage meter machine; and displaying said specific number of frankings at said postage meter machine at a beginning of said start and initialization routine.

22. A method as claimed in claim 21 comprising the additional steps of:

transmitting funding and franking data for said postage meter machine from said postage meter machine to said central data station; and calculating said specific number of frankings, from said funding and flanking data, at said central data station in parallel with the calculation of said specific number at said postage meter machine.

23. A method as claimed in claim 9 comprising the additional step of:

determining whether a valid code word is present in said postage meter machine by interrogating a predetermined memory location to obtain the contents of said predetermined memory location, and subjecting said contents of said predetermined memory location to a checksum analysis in a one-time programmable processor.

24. A method as claimed in claim 23 wherein said valid code word is stored in said predetermined memory location protected by a message authentification code, and wherein said one-time programmable processor includes means for detecting and decoding said message authentification code.

25. A method as claimed in claim 9 comprising the additional steps of:

storing accounting data regarding funding of said postage meter machine in a plurality of postal registers;

causing said system routine to place said postage meter machine in a kill mode, inhibiting any franking, in the absence of a valid code word in said postage meter machine;

in said kill mode, partially erasing the contents of said postal registers in a predetermined manner; and causing said postage meter machine to enter into a display mode after conducting a statistical error evaluation.

26. A method as claimed in claim 25 comprising the additional steps of:

appending a message authentification code to all data in said postal registers and to said valid code word; and in said franking mode, checking for a manipulation of the data of said postal registers by checking said message authentification code in an accounting and priming routine in said franking mode.

27. A method as claimed in claim 25 wherein the step of storing said accounting data in said postal registers is further defined by storing said accounting data redundantly in said postal registers, and wherein the step of partially erasing said postal registers in a predetermined manner in said kill mode is further defined by reducing the redundancy of the contents of said postal registers in a predetermined manner in said kill mode and thereby producing a type of error which cannot be independently corrected by said postage meter machine.

28. A method as claimed in claim 9 comprising the additional steps of:

allotting an allotted number of frankings which can be conducted by said postage meter machine in said franking mode given an amount of funds which are present in said postage meter machine; and causing said system routine to enter into a sleeping mode, wherein a franking procedure is altered, when a number of frankings conducted by said postage meter machine in said franking mode approaches said allotted number.

29. A method as claimed in claim 28 comprising the additional step of:

if said postage meter machine enters into said sleeping mode, displaying a warning at said postage meter machine and imposing a franking delay for a predetermined chronological duration.

30. A method as claimed in claim 28 comprising the additional steps of:

maintaining an ascending register in said postage meter machine having a register value which changes upon each flanking by said postage meter machine;

periodically interrogating said ascending register to obtain an interrogated register value $R2_{old}$;

said system routine causing said postage meter machine to conduct a printing impression in said franking mode, and maintaining a count $R8_{old}$ of all impressions made by said postage meter machine;

calculating, in said postage meter machine, a calculated number S' as said allotted number by adding an average number $S_0$ of items to a disposition number $S_x$ of items;

calculating $S_0$ according to the equation $$S_0 = R8_{old}\left[\frac{R2_{new}}{R2_{old}} - 1\right]$$

wherein $R2_{new}$ is a requested, future value of said ascending register; and calculating $S_x$ according to the equation $$S_x = \alpha_x \cdot R8_{old} \cdot R1_{old}/R2_{old}$$

wherein $\alpha_x$ identifies a classification of a user of said postage meter machine as an A, B or C customer.

31. A method as claimed in claim 28 comprising the additional steps of:

maintaining an ascending register in said postage meter machine having a register value which changes upon each franking by said postage meter machine;

periodically interrogating said ascending register to obtain an interrogated register value $R2_{old}$;

said system routine causing said postage meter machine to conduct a printing impression in said franking mode, and maintaining a count $R4_{old}$ of valid impressions respectively made for authorized frankings;

calculating, in said postage meter machine, a calculated number S' as said allotted number by adding an average number $S_0$ of items to a disposition number $S_x$ of items;

calculating $S_0$ according to the equation $$S_0 = R4_{old}\left[\frac{R2_{new}}{R2_{old}} - 1\right]$$

wherein $R2_{new}$ is a requested, future value of said ascending register; and calculating $S_x$ according to the equation $$S_x = \alpha_x \cdot R4_{old} \cdot R1_{old}/R2_{old}$$

wherein $\alpha_x$ identifies a classification of a user of said postage meter machine as an A, B or C customer.

32. A method as claimed in claim 28 comprising the additional steps of:

following each communication between said central data station and said postage meter machine wherein said postage meter machine is re-funded, setting a sleeping mode counter to a count corresponding to said allotted number of frankings; and decrementing said count of said sleeping mode counter upon each franking until said count of said sleeping mode counter reaches zero.

33. A method as claimed in claim 28 comprising the additional steps of:

setting, in said postage meter machine, a specified number S as said allotted number;

setting a reference number $S_{ref}$ of frankings;

decrementing S upon each franking;

after each franking, comparing S to $S_{ref}$;

causing said postage meter machine to enter into said sleeping mode when S is less than $S_{ref}$;

in said sleeping mode, continuing to decrement S upon each franking and also decrementing $S_{ref}$ upon each franking and, as long as S is less than $S_{ref}$, lengthening said chronological duration of said franking delay by a predetermined lengthening amount following each franking; and when S=0, checking for the presence of one of said current code word or said new code word in said postage meter machine.

34. A method as claimed in claim 33 comprising the additional steps of:

displaying said warning for the duration of each franking delay.

35. A method as claimed in claim 33 comprising the additional step of:

following each franking after which S is less than $S_{ref}$, calculating a new value for $S_{ref}$ by dividing a predetermined maximum number of frankings by a predetermined number and thereafter using said new value as the "value for $S_{ref}$ for comparing with S until a next flanking after which S is less than $S_{ref}$, then repeating this step with said predetermined number incremented.

36. A method as claimed in claim 9 comprising the additional steps of:

for conducting a franking in said franking mode, conveying an item at a conveying speed beneath a printing head and making a franking impression on said item; and monitoring said conveying speed of said item as indicative of the occurrence of each franking impression.

37. A method as claimed in claim 36 comprising the additional step of displaying a warning if said limit for said conveying speed is exceeded; and inhibiting said postage meter machine if no response is made to adjust said conveying speed below said value following said display.

38. A method as claimed in claim 37 wherein the step of monitoring said conveying speed of said item is further defined by the steps of:

measuring said conveying speed with an encoder which produced encoder pulses indicative of said conveying speed; and measuring a number of said encoder pulses occurring during a time window and adjusting said conveying speed if said number of encoder pulses in said time window deviates from a specified number of encoded pulses.

39. A method as claimed in claim 38 comprising the additional step of defining said time window by a crystal-controlled clock generator in said postage meter machine.

40. A method as claimed in claim 38 comprising the additional steps of:

logging an error if said number of encoder pulses within said time window deviates from said specified number of encoder pulses by a specified deviation; and accumulating a count of said errors and disabling said postage meter machine if said count of said errors exceeds a predetermined count value.

41. A method as claimed in claim 9 comprising the additional steps of:

for conducting a franking in said franking mode, making a franking impression on an item by moving an inking ribbon at a ribbon speed beneath a thermal transfer printer;

measuring said ribbon speed with an encoder which produces encoder pulses indicative of said ribbon speed; and measuring a number of said encoder pulses occurring during a time window and adjusting said ribbon speed if said number of encoder pulses in said time window deviates from a specified number of encoded pulses.

42. A method as claimed in claim 41 comprising the additional step of defining said time window by a crystal-controlled clock generator in said postage meter machine.

43. A method as claimed in claim 41 comprising the additional steps of:

logging an error if said number of encoder pulses within said time window deviates from said specified number of encoder pulses by a specified deviation; and accumulating a count of said errors and disabling said postage mater machine if said count of said errors exceeds a predetermined count value.

44. A method as claimed in claim 41 comprising the additional step of displaying a warning if said limit for said ribbon speed is exceeded; and inhibiting said postage meter machine if no response is made to adjust said ribbon speed below said value following said display.

45. A method as claimed in claim 41 comprising the additional steps of:

making said franking impression with said thermal transfer printer by column-by-column printing;

comparing a chronological duration for printing each column in which variable data are present to a specified chronological duration; and inhibiting said postage meter machine dependent on a number of times for which said specified chronological duration is exceeded.

46. A method for improving the security of a postage meter machine which is capable of communication with a remote central data station, said postage meter machine containing a microprocessor which controls the execution of a start and initialization routine followed by a system routine, said system routine including a franking mode, said method comprising the steps of:

establishing a first criterion indicative of whether the security of said postage meter machine has been breached;

if said first criterion is not satisfied, placing said postage meter machine in a first mode which prevents said postage meter machine from conducting a franking;

requiring specific measures to be undertaken before said postage meter machine is again capable of franking following entry of said postage meter machine into said first mode;

if said first criterion is satisfied, calling in current data from said microprocessor to conduct a flanking;

establishing a second security-related criterion;

if said second security-related criterion is not satisfied after said current data are called in, causing said postage meter machine to enter into a second mode; and in said second mode, displaying a warning of impending disablement of said postage meter machine.

47. A method as claimed in claim 46 comprising the additional step of, in said second mode, additionally displaying a request to initiate a communication from the postage meter machine to said central data station.

48. A method as claimed in claim 46 comprising the additional step of maintaining a count of each time each of said first or second security-related criterion is not satisfied; and analyzing said count as a basis for determining a level of security of said postage meter machine.

49. A method as claimed in claim 46 comprising the additional steps of:

inhibiting said postage meter machine if said second security-related criterion is not satisfied, by setting a flag;

undertaking preparatory steps for communicating with said central data station including interrogating said postage meter machine for the presence of said flag; and resetting said flag when communication with said central data station is established.

50. A method as claimed in claim 46 wherein the step of establishing said second security-related criterion comprises establishing a maximum number of frankings which can be conducted by said postage meter machine and continuously comparing, upon each flanking, said maximum number against a running count of the number of items flanked by said postage meter machine.

51. A method as claimed in claim 50 wherein the step of establishing a maximum number of flankings comprises the steps of:

calculating a maximum piece number; and dividing said maximum piece number by a predetermined number to obtain said maximum number of frankings.

52. A method as claimed in claim 50 wherein the step of establishing a maximum number of frankings comprises the steps of:

obtaining a maximum piece number from said central data station in a communication between said postage meter machine and said central data station; and dividing said maximum piece number by a predetermined number to obtain said maximum number of frankings.

53. A method as claimed in claim 50 comprising the additional steps, in said second mode, of:

comparing said running count of the number of items franked by said postage meter machine to a further franking number criterion;

if said further franking number criterion is not satisfied, automatically requesting communication from said postage meter machine to said central data station and conducting a transaction between said postage meter machine and said central data station including the transmission from said postage meter machine to said central data station of at least one decision criterion protected by a MAC; and cancelling the automatic communication request if said transaction is successfully completed.

54. A method as claimed in claim 53 comprising the additional steps of:

repeatedly interrogating, in said franking mode, whether said further franking number criterion has been satisfied; and automatically branching from said franking mode to a communication mode for communicating between said postage meter machine and said central data station if said further franking number criterion is satisfied.

55. A method as claimed in claim 53 comprising the additional step of:

employing the number zero as said further franking number criterion.

56. A method as claimed in claim 53 comprising the additional step of:

distinguishing whether said transaction has been requested manually or automatically.

57. A method as claimed in claim 46 comprising the additional steps of:

logging all errors arising in the operation of said postage meter machine;

entering into said second mode if a total of said logged errors exceeds an error overflow limit; and requiring a communication with said central data station or inspection of said postage meter machine by authorized personnel in order to reset said log of errors to remove said postage meter machine from said second mode.

58. A method as claimed in claim 57 comprising the additional step, in said second mode, of:

retarding a time required by said postage meter machine to conduct a franking when in said second mode.

59. A method as claimed in claim 58 wherein the step of retarding the time required to conduct a franking is further defined by increasingly retarding the time required to conduct a franking as the number of logged errors increases.

60. A method as claimed in claim 58 wherein the step of retarding the time required to conduct a franking is further defined by increasing the time required to conduct a franking by a specified time step as each additional error is logged.

61. A method as claimed in claim 58 comprising the additional steps of:

identifying an error as an error arising due to operator mistake; and actuating an electronic time lock of said postage meter machine which increases the time required to conduct a franking upon each error identified as an operator mistake.

62. A method for improving the security of a postage meter machine which is capable of communication with a remote central data station, said postage meter machine containing a microprocessor which controls the execution of a start and initialization routine followed by a system routine, said system routine including a franking mode, said method comprising the steps of:

internally distinguishing within said postage meter machine between non-manipulated and manipulated operation of said postage meter machine by supervising a chronological duration of the execution of programs or program sub-routines in said postage meter machine by comparing a measured running time of a program or sub-routine to a predetermined running time; and initiating measures to ensure the security of said postage meter machine if said predetermined running time is not equal to said measured running time, including placing said postage meter machine in a first mode wherein franking is prevented, and requiring establishment of a first security criterion to exit said first mode.

63. A method as claimed in claim 62 wherein the steps of supervising said chronological duration and comparing said running time are further defined by supervising said chronological duration and comparing said running time in an OTP.

64. A method for improving the security of a postage meter machine which is capable of communication with a remote central data station, said postage meter machine containing a microprocessor which controls the execution of a start and initialization routine followed by a system routine, said system routine including a franking mode, said method comprising the steps of:

varying a count value during execution of a program routine in said postage meter machine;

comparing said count value to a predetermined count value after the execution of said program routine; and initiating steps to ensure the security of said postage meter machine if said count value is not equal to said predetermined count value including placing said postage meter machine in first mode wherein franking is prevented, requiring establishment of a first security criterion to exit said first mode.

65. A method as claimed in claim 64 wherein said program routine includes a plurality of branches, and wherein the step of varying a count value is further defined by varying a count value in a memory at at least one point during the execution of said program routine at which a branch takes place by multiplying said count value by a specified prime number allocated to said branch, and wherein the step of comparing said count value is further defined by identifying which branch exceeded said predetermined count value by conducting a prime number resolution of any count value which exceeds said predetermined count value.

66. A method for improving the security of a postage meter machine which is capable of communication with a remote central data station, said postage meter machine containing a microprocessor, under the supervision of an OTP, for executing a start and initialization routine followed by a system routine, said system routine including a franking mode, said method comprising the steps of:
    forming a checksum in said OTP for a content of an external program memory;
    comparing said checksum to a predetermined value stored in said OTP at a specified point in the operation of said postage meter machine; and
    inhibiting said postage meter machine if said predetermined value and said checksum do not coincide including placing said postage meter machine in first mode wherein franking is prevented, requiring establishment of a first security criterion to exit said first mode.

67. A method as claimed in claim 66 wherein said predetermined time is before execution of said flanking mode.

68. A method as claimed in claim 66 wherein said predetermined time is after execution of said flanking mode.

69. A method as claimed in claim 66 wherein said predetermined time is during said start and initialization routine.

70. A method as claimed in claim 66 wherein said postage meter machine has a standby mode wherein flankings are not conducted, and wherein said predetermined time is during said standby mode.

71. A method as claimed in claim 70 comprising the additional steps of:
    forming a checksum of accounting register readings during said standby mode; and
    comparing said checksum of said accounting register readings to a further predetermined value and inhibiting said postage meter machine if said checksum of said accounting register readings is not equal to said further predetermined value.

72. A method as claimed in claim 66 comprising the additional steps of:
    in said flanking mode, initiating a print output request each time a flanking image is to be primed and, after printing, repeating a program loop to determine if a further print output request exists and, if so, repeating said program loop including a printing;
    monitoring whether a print output request is absent for a predetermined time;
    if said predetermined time is exceeded without a print output request, setting a flag and returning a beginning of said system routine;
    interrogating said postage meter machine for the presence of said flag and, if said flag is present, placing said postage meter machine in a standby mode;
    in said standby mode, forming said checksum of the content of said program memory and comparing said checksum; and
    if said checksum comparison is acceptable, resetting said flag, and if said checksum comparison is unfavorable, inhibiting said postage meter machine.

73. A method as claimed in claim 72 comprising the additional step of requiring the presence of a valid code word to be stored in said postage meter machine in order for said postage meter machine to operate, and wherein the step of inhibiting said postage meter machine is further defined by erasing said valid code word.

74. Method for improving the security of a postage meter machine containing a control unit, said method comprising the steps of:
    (a) communicating data from a data central to the postage meter machine corresponding to a requested, authorized operation performed on the postage meter machine and logging said operation as an allowed operation in the control unit;
    (b) distinguishing in said control unit among requested, authorized and unauthorized operations performed on the postage meter machine using the data communicated from the data central, and logging an operation as an error given unauthorized operation performed on the postage meter machine and, after the conclusion of an authorized operation performed on the postage meter machine, restoring said postage meter machine to its original operating condition using said data communicated from the data central;
    (c) switching the postage meter machine into a first mode and thereby disabling said postage meter machine when the correct data are absent because an unauthorized operation was performed on the postage meter machine; and
    (d) placing said postage meter machine in a second mode and displaying a warning indicating an imminent automatic communication from said postage meter machine to said data central.

75. A method as claimed in claim 74 wherein said postage meter machine has an openable housing, and said method comprising the additional steps of:
    providing a sensor which generates a signal upon the opening of said housing;
    supplying said signal to said control unit; and
    employing the presence of said signal in said control unit in combination with said data communicated from said data central for distinguishing among requested, authorized and unauthorized operations performed on said postage meter machine.

76. A method as claimed in claim 74 comprising the additional step of operating said postage meter machine using a program having a plurality of program parts, each program part having a specified time for executing said program part, and wherein the step (b) is further defined by monitoring said time for a selected program part, setting a flag in a memory in said postage meter machine if said measured time is not equal to said specified time, repeatedly interrogating said memory to determine the presence of said flag therein, and given the presence of said flag in said memory, executing (c).

77. A method as claimed in claim 76 comprising the additional steps of:
    storing a codeword in a memory of said postage meter machine and requiring the continued presence of said codeword in said memory in order to prevent said postage meter machine from automatically transferring into said first mode when said postage meter machine is opened;

erasing said codeword in said memory if said time associated with said selected program part is exceeded and overwriting said codeword in said memory with a predetermined different word and repeatedly interrogating said memory for the presence of said codeword, and switching said postage meter machine in step (c) into said first mode given the absence of said codeword in said memory.

78. A method as claimed in claim 77 wherein said postage meter machine contains a plurality of stored security-related data in addition to said codeword, and comprising the additional steps of:

erasing at least a portion of said security-relevant data if said time for said selected program part is exceeded;

repeatedly interrogating memory locations at which said additional security-relevant data are stored to determine the complete presence of said security-relevant data; and executing step (c) if an interrogation of said memory location indicates that any of said security-relevant data has been erased.

79. A method as claimed in claim 74 comprising the additional step of operating said postage meter machine using a program having a plurality of program parts, each program part having a specified number of repetitions for executing said program part, and wherein the step (b) is further defined by monitoring said number of repetitions for a selected program part, setting a flag in a memory in said postage meter machine if said number of repetitions is exceeded, repeatedly interrogating said memory to determine the presence of said flag therein, and given the presence of said flag in said memory, executing (c).

80. A method as claimed in claim 79 comprising the additional steps of:

storing a codeword in a memory of said postage meter machine and requiring the continued presence of said codeword in said memory in order to prevent said postage meter machine from automatically transferring into said first mode when said postage meter machine is opened;

erasing said codeword in said memory if said number of repetitions associated with said selected program part is exceeded and overwriting said codeword in said memory with a predetermined different word and repeatedly interrogating said memory for the presence of said codeword, and switching said postage meter machine in step (c) into said first mode given the absence of said codeword in said memory.

81. A method as claimed in claim 80 wherein said postage meter machine contains a plurality of stored security-related data in addition to said codeword, and comprising the additional steps of:

erasing at least a portion of said security-related data if said number of repetitions for said selected program part is exceeded;

repeatedly interrogating memory locations at which said additional security-relevant data are stored to determine the complete presence of said security-relevant data;and executing step (c) if an interrogation of said memory location indicates that any of said security-relevant data has been erased.

82. A method for improving security of a postage meter machine containing a control unit, said method comprising the steps of:

franking postal items in said postage meter machine using a printing head, said items being conveyed beneath said printing head at a conveying speed and said franking taking place at a printing speed;

executing programs in said postage meter machine for franking items, said programs having an execution time associated therewith and having a count value associated therewith which is varied during execution of a program;

selecting at least one of said conveying speed, said printing speed, said program execution time or said count value as a first security indicator and comparing said first security indicator to a first security criterion; and placing said postage meter machine in a first mode if said first security indicator does not satisfy said first security criterion and preventing further franking by said postage meter machine in said first mode and requiring establishment of said first security criterion to exit said first mode.

* * * * *